(12) United States Patent
Kurihara et al.

(10) Patent No.: US 12,087,321 B2
(45) Date of Patent: Sep. 10, 2024

(54) EVALUATION METHOD, EVALUATION APPARATUS, AND PROGRAM

(71) Applicant: NIPPON TELEGRAPH AND TELEPHONE CORPORATION, Tokyo (JP)

(72) Inventors: Sachiko Kurihara, Tokyo (JP); Noboru Harada, Tokyo (JP); Masahiro Fukui, Tokyo (JP); Akira Nakagawa, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 233 days.

(21) Appl. No.: 17/795,851

(22) PCT Filed: Jan. 30, 2020

(86) PCT No.: PCT/JP2020/003338
§ 371 (c)(1),
(2) Date: Jul. 27, 2022

(87) PCT Pub. No.: WO2021/152759
PCT Pub. Date: Aug. 5, 2021

(65) Prior Publication Data
US 2023/0076338 A1    Mar. 9, 2023

(51) Int. Cl.
*G10L 25/60* (2013.01)
*H04R 1/02* (2006.01)
(Continued)

(52) U.S. Cl.
CPC .............. *G10L 25/60* (2013.01); *H04R 1/025* (2013.01); *H04R 1/08* (2013.01); *H04R 29/001* (2013.01);
(Continued)

(58) Field of Classification Search
None
See application file for complete search history.

(56) References Cited

U.S. PATENT DOCUMENTS 6,965,787 B2 * 11/2005 Kindo ................... H04B 1/3877
455/90.3
8,102,995 B2 *  1/2012 Kim ..................... H04M 1/6083
381/86
(Continued)

OTHER PUBLICATIONS

ITU-T (1996) "ITU-T Recommendation p. 800: Methods for subjective determination of transmission quality", ITU.
(Continued)

*Primary Examiner* — Paul W Huber

(57) ABSTRACT

The number of conversational tests needed for the evaluation of acoustic quality of the ICC system is reduced. An evaluation value conversion device 3 evaluates the quality of communication between a near-end acoustic region 100 and a far-end acoustic region 200 inside a vehicle for which a plurality of acoustic regions are predetermined. A voice signal picked up by a microphone M2 disposed in the far-end acoustic region 200 is emitted from a speaker S1 disposed in the near-end acoustic region 100. An objective evaluation value acquisition unit 33 acquires a first evaluation value by treating a voice signal obtained by combining a voice signal resulting from a first voice signal being emitted from a sound source in a seat belonging to the far-end acoustic region 200, picked up by the microphone M2, and emitted from the speaker S1 with a voice signal arriving at a seat belonging to the near-end acoustic region 100 as a result of the first voice signal being transmitted through the space inside the vehicle as an evaluation target sound, and treating the first voice signal as a reference sound. An evaluation value reuse unit 37 acquires the first evaluation value as an evaluation value of communication (Continued)

between a seat belonging to the near-end acoustic region 100 and a seat belonging to the far-end acoustic region 200.

5 Claims, 14 Drawing Sheets

(51) Int. Cl.
  *H04R 1/08* (2006.01)
  *H04R 29/00* (2006.01)
  *G10L 21/0208* (2013.01)
  *G10L 21/0216* (2013.01)

(52) U.S. Cl.
  CPC ............... *G10L 2021/02082* (2013.01); *G10L 21/0216* (2013.01); *H04R 2499/13* (2013.01)

(56) References Cited

U.S. PATENT DOCUMENTS

| | | | |
|---|---|---|---|
| 9,881,632 B1* | 1/2018 | Every | H04R 3/005 |
| 2020/0007690 A1* | 1/2020 | Miyamoto | H04M 9/085 |

OTHER PUBLICATIONS

ITU-T (2001) "ITU-T Recommendation p. 862: Perceptual evaluation of speech quality (PESQ): An objective method for end-to-end speech quality assessment of narrow-band telephone networks and speech codecs", ITU.

NTT Holding Company Press Release, "Development of sound pickup technology for comfortable voice operation and communication in automobiles", [online], [retrieved Apr. 8, 2019], Internet <URL: http://www.ntt.co.jp/news2018/1802/180219c.html> with translation generated by machine.

Kurihara et al. (2019) "QoE Estimation of Hands-free Inker Communication System by PESQ", Acoustical Society of Japan, Autumn Meeting Lecture Collection 1-2-10, Aug. 21, 2019, pp. 1319-1322, with translation generated by machine.

Kurihara et al. (2019) "Study on quality of experience assessment in hands-free communications", IEICE Society Conference Convention essay collection B-11-27, Aug. 27, 2019, p. 183 with translation generated by machine.

* cited by examiner

Fig. 4

130 EVALUATION INPUT SCREEN 131-1 EASE OF HEARING OTHER PARTY'S VOICE 132-1:
- EXTREMELY EASY TO HEAR ●
- NO PROBLEMS WITH HEARING ○
- SLIGHTLY DIFFICULT TO HEAR ○
- DIFFICULT TO HEAR ○
- EXTREMELY DIFFICULT TO HEAR ○

133-1

131-2 NOIZINESS 132-2:
- NO NOISE AT ALL ○
- A LITTLE NOISE ○
- NOISE PRESENT ●
- VERY NOISY ○
- EXTREMELY NOISY ○

133-2

131-3 RETURN OF OEN'S OWN VICE 132-3:
- NO RETURN OF ONE'S OWN VOICE AT ALL ○
- A LITTLE RETURN OF ONE'S OWN VOICE ●
- SOME RETURN OF ONE'S OWN VOICE ○
- LOUD RETURN OF ONE'S OWN VOICE ○
- EXTREMELY LOUD RETURN OF ONE'S OWN VOICE ○

133-3

134 CONFIRM

| EXPERIMENTAL CONDITIONS | EXPECTED EVALUATION VALUE | EVALUATION VALUE INDICATOR | AVERAGE EVALUATION VALUE (CONVENTIONAL) | AVERAGAE EVALUATION VALUE (EMBODYMENT) |
|---|---|---|---|---|
| I | 4 OR 5 | 1 OR 2 IS UNLIKELY | 4.1 | 4.4 |
| II | 1 OR 2 | 4 OR 5 IS UNLIKELY | <u>3.3</u> | 1.4 |
| III | 3 OR 4 | 1 IS UNLIKELY | 4.0 | 3.2 |
| IV | 2 OR 3 | 5 IS UNLIKELY | <u>3.5</u> | 2.1 |

Fig. 6

EVALUATION METHOD, EVALUATION APPARATUS, AND PROGRAM

CROSS-REFERENCE TO RELATED APPLICATIONS

This application is a U.S. National Stage Application filed under 35 U.S.C. § 371 claiming priority to International Patent Application No. PCT/JP2020/003338, filed on 30 Jan. 2020, the disclosure of which is hereby incorporated herein by reference in its entirety.

TECHNICAL FIELD

The present invention relates to a technique for evaluating the acoustic quality of conversation inside a vehicle.

BACKGROUND ART

With the development of communication technologies, and due to the convenience of being able to talk on the phone without holding a device, there are increasing opportunities to use loudspeaker hands-free communication systems such as conferencing systems and hands-free call for smartphones. To remove acoustic echo signal and ambient noise which are problematic for loudspeaker hands-free communication systems and provide a comfortable telephony environment, an acoustic echo canceller (AEC) is used.

Acoustic echo signal is a phenomenon that occurs when sound transmitted from the near end is outputted from the speaker at the far end and picked up by the microphone at the far end. If the effect of the acoustic echo canceller is weak, the acoustic echo signal will not be fully eliminated, whereas if the effect is too strong, the sound to be transmitted from the far end will also be removed and become distorted or drop out, making it difficult to hear. The performance of an acoustic echo canceller depends on how accurately the acoustic echo signal is eliminated, and therefore the mainstream of conventional performance evaluations of acoustic echo cancellers are objective evaluations focusing on the amount of acoustic echo signal elimination. Although objective evaluation is convenient as computer processing is applicable for the evaluation, there is a problem in that the evaluation does not necessarily agree with the quality experienced by the user in actual telephony (also referred to as the "quality of experience").

To evaluate the acoustic echo signal and the processed sound from an acoustic echo canceller by subjective evaluation, it is necessary to perceive the acoustic echo signal, and the evaluation becomes possible only when evaluating person himself or herself talks on the phone. For this reason, in a loudspeaker hands-free communication system such as hands-free call, quality evaluation through a two-way conversational test has been recommended (see Non-Patent Literature 1). On the other hand, there are problems in that carrying out the conversational test requires know-how, is laborious and costly, and reproducibility is low. Consequently, a method that simplifies the conversational test and performs a subjective evaluation through a listening test targeting one-way telephony has also been proposed. Also, objective evaluation methods such as perceptual evaluation of speech quality (PESQ), which estimates a subjective evaluation value through a listening test from an acoustic signal obtained by recording conversational speech, have also been established (see Non-Patent Literature 2).

As one application of a loudspeaker hands-free communication system, in-car communication (ICC) system that supports conversation between occupants inside a vehicle is beginning to be used (see Non-Patent Literature 3). However, a standard for proper evaluation of acoustic quality of the ICC system has not been formulated yet.

PRIOR ART LITERATURE

Non-Patent Literature

Non-Patent Literature 1: ITU-T, "ITU-T Recommendation P.800: Methods for subjective determination of transmission quality", ITU, 1996

Non-Patent Literature 2: ITU-T, "ITU-T Recommendation P.862: Perceptual evaluation of speech quality (PESQ): An objective method for end-to-end speech quality assessment of narrow-band telephone networks and speech codecs", ITU, 20011996

Non-Patent Literature 3: NTT Holding Company Press Release, "Development of sound pickup technology for comfortable voice operation and communication in automobiles", [online], [retrieved Apr. 8, 2019], Internet <URL: http://www.ntt.co.jp/news2018/1802/180219c.html>

SUMMARY OF THE INVENTION

Problems to be Solved by the Invention

ICC system is a technique that supports conversation inside a vehicle, and therefore the quality needs to be evaluated through a conversational test. However, a variety of use conditions are anticipated with ICC system, such as when traveling, differences in the speed of travel if traveling, and when stopped. Furthermore, the test must be performed for all combinations of seats inside the vehicle. For example, as illustrated in FIG. 1, if a use case inside a vehicle 90 with seats arranged in three rows is assumed, a conversational test is performed with following presumption for the combination of a driver's seat 91 and a rear seat 97:

a voice signal produced from the driver's seat 91 is picked up by a microphone 1F installed in the first row, an occupant listens a sound signal emitted from a speaker 2R installed in the third row at the rear seat 97, a voice signal produced from the rear seat 97 is picked up by a microphone 1R installed in the third row, and an occupant listens a sound signal emitted from a speaker 2F installed in the first row at the driver's seat 91. It is necessary to perform above conversational test for all combinations of seats for which conversation using ICC system is assumed to occur. This is because the signal that should be eliminated (that is, the echoes that should be canceled) from the picked-up acoustic signal is different for every combination of communicating seats. Consequently, the evaluation of acoustic quality of the ICC system requires a huge number of conversational tests.

In light of technical problems like the above, an objective of the invention is to provide a technique capable of reducing the number of conversational tests needed for the evaluation of acoustic quality of the ICC system.

Means to Solve the Problems

To address the above problems, an evaluation method according to one aspect of the invention is an evaluation method of evaluating a quality of communication between seats in a vehicle including at least three seats belonging to any of a plurality of acoustic regions, in which at least one speaker and at least one microphone are disposed for each acoustic region, and a voice signal picked up by a first microphone disposed in a first acoustic region is emitted from a second speaker disposed in a second acoustic region, the evaluation method comprising: acquiring, by a first evaluation value acquisition unit, a first evaluation value that is an evaluation value of communication between a first seat and a second seat by treating a voice signal obtained by combining a voice signal resulting from a first voice signal being emitted from a sound source in the first seat belonging to the first acoustic region, picked up by the first microphone, and emitted from the second speaker with a voice signal arriving at the second seat belonging to the second acoustic region as a result of the first voice signal being transmitted through a space inside the vehicle as an evaluation target sound, and treating the first voice signal as a reference sound; and acquiring, by a second evaluation value acquisition unit, the first evaluation value as an evaluation value of communication between any seat belonging to the first acoustic region and any seat belonging to the second acoustic region, except between the first seat and the second seat.

Effects of the Invention

According to the invention, the quality of ICC system can be evaluated with a small number of conversational tests or without performing a conversational test.

BRIEF DESCRIPTION OF THE DRAWINGS

FIG. 4 is a diagram illustrating an example of the display content of an evaluation input screen.

FIG. 6 is a diagram for explaining experimental results.

DETAILED DESCRIPTION OF THE EMBODIMENTS

Figure 1:
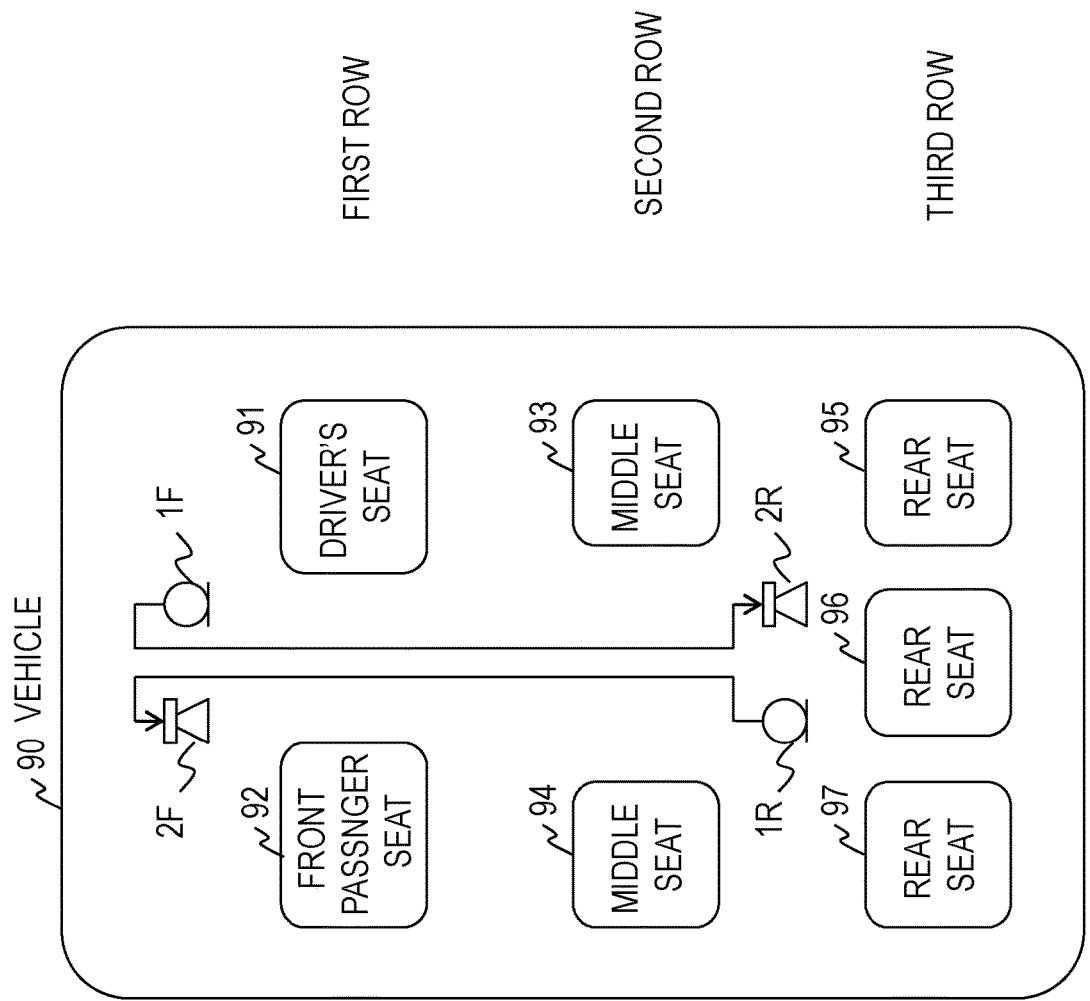
FIG. 1 is a diagram for explaining an example of an ICC system use environment.

Hereinafter, embodiments of the invention will be described in detail. Note that structural elements having the same function are denoted with the same reference numbers in the drawings, and duplicate description of such elements is omitted.

<Acoustic Quality Evaluation Test in Loudspeaker Hands-Free Communication System>

First, an acoustic quality evaluation test in a loudspeaker hands-free communication system will be described conceptually. In the acoustic quality evaluation test, a near-end talker and a far-end talker speak through a loudspeaker hands-free communication system, and an evaluator positioned on the near-end talker side evaluates the quality of the loudspeaker hands-free communication system. Note that a loudspeaker hands-free communication system refers to a communication system that transmits and receives acoustic signals between terminal devices provided with a microphone and a speaker, in which at least some of the sound outputted from the speaker of a terminal device is picked up by the microphone of the terminal device (in which wraparound voice signal occurs). Examples of loudspeaker hands-free communication systems include audio teleconferencing systems, videoconferencing systems, and also in-car communication.

In a loudspeaker hands-free communication system, speech by the near-end talker is picked up by a microphone on the near-end talker side, an acoustic signal obtained on the basis of the speech is transmitted over a network to the far-end talker side, and sound expressed by the acoustic signal is outputted from a speaker on the far-end talker side. Also, sound on the far-end talker side is picked up by a microphone on the far-end talker side, an acoustic signal obtained on the basis of the sound is transmitted over a network to the near-end talker side, and sound expressed by the acoustic signal is outputted from a speaker on the near-end talker side. However, at least some of the sound outputted from the speaker on the far-end talker side is also picked up by the microphone on the far-end talker side. In other words, the sound on the far-end talker side picked up by the microphone on the far-end talker side is the result wraparound voice signal (acoustic echo signal) of the near-end speaker is added to the speech by the far-end speaker.

In other words, the sound on the far-end talker side picked up by the microphone on the far-end talker side is based on a signal in which a signal based on the speech by the near-end talker is degraded in the space on the far-end talker side and superimposed onto the signal based on the speech by the far-end talker. Note that when the near-end talker is not speaking, a signal based on the speech by the near-end talker is not superimposed, and therefore the speech by the far-end talker is not degraded. Also, the superimposing of ambient noise on the far-end talker side may be a factor in the degradation of the sound on the far-end talker side.

The acoustic signal transmitted to the near-end talker side may originate from a processed signal obtained by performing predetermined signal processing on a signal expressing sound picked up by the microphone on the far-end talker side, or may be obtained without performing such signal processing. The signal processing may be any type of processing. One example of signal processing is processing including at least one of echo cancellation processing and noise cancellation processing. Note that "echo cancellation processing" means processing by an echo canceller in the broad sense for reducing echo. "Processing by an echo canceller in the broad sense" means all sorts of processing for reducing echo. The processing by an echo canceller in the broad sense may be achieved, for example, by an echo canceller in the narrow sense only that uses an adaptive filter, by a voice switch, by an echo reduction, by combination of at least some of the above technologies, or by furthermore combination with other technique (see Reference Literature 1 below). Also, the noise cancellation processing means processing that suppresses or removes a noise component originating from any type of environmental noise other than the speech by the far-end talker occurring around the microphone of a far-end terminal. Environmental noise refers to air conditioning sounds in an office, sounds inside a traveling car, sounds of cars passing through an intersection, insect sounds, keyboard typing sounds, or the voices of multiple people (crowd noise), for example, regardless of volume or indoor/outdoor sound (see Reference Literature 2 below).

Reference Literature 1: Knowledge Base Chishiki no Mori, Group 2 Part 6 Chapter 5, "Acoustic Echo Cancellers", the Institute of Electronics, Information and Communication Engineers (IEICE), [online], [retrieved Mar. 5, 2019], Internet <URL: http://www.ieice-hbkb.org/files/02/02gun_06hen_05.pdf>

Reference Literature 2: Sumitaka SAKAUCHI, Yoichi HANEDA, Masashi TANAKA, Junko SASAKI, and Akitoshi KATAOKA, "Acoustic echo canceller with noise suppression and echo suppression functions", IEICE Transactions, Vol. J87-A, No. 4, pp. 448-457, April 2004

<Subjective Evaluation Value: Conversational Test>

The subjective evaluation through a conversational test is performed as follows. The evaluator listens to an acoustic signal outputted from a speaker on the near-end talker side, and selects an evaluation category that best fits on the basis of the subjective experience of the near-end talker from among evaluation categories classified into a predetermined number of levels. For example, ITU-T Recommendation P.800 cited in Non-Patent Literature 1 proposes a classification into the five levels of "Excellent", "Good", "Fair", "Poor", "Bad" as evaluation categories, and assignment of an evaluation value to each evaluation category in the order of 5, 4, 3, 2, 1. The subjective evaluation is performed a plurality of times each by multiple evaluators while changing the party on the other end, and the acoustic quality is evaluated by aggregating the collected evaluation values.

<Subjective Evaluation Value: Listening Test>

The subjective evaluation through a listening test is performed as follows. The evaluator uses a binaural sound reproduction device such as headphones or earphones to listen to and compare alternately an acoustic signal representing a sound outputted from a speaker on the near-end talker side assuming that there is no degradation of the voice on the far-end talker side and there is no wraparound voice on the far-end talker side (that is, the reference sound) and an acoustic signal representing a sound outputted from a speaker on the near-end talker side in the case there are wraparound voices on the far end talker side (that is, the evaluation target sound) to make a subjective evaluation (opinion test) of the communication quality. The subjective evaluation is performed a plurality of times each by multiple evaluators with respect to multiple pairs of an acoustic signal expressing a reference sound and an acoustic signal expressing a sound to be evaluated, and the acoustic quality is evaluated by aggregating the collected evaluation values.

<Objective Evaluation Value: PESQ>

In the objective evaluation through PESQ, a pair of an acoustic signal expressing a reference sound and an acoustic signal expressing an evaluation target sound which is acquired as described above is treated as input, and the PESQ value is calculated according to the calculation method described in Non-Patent Literature 2 for example. The "original signal X(t)" described in Non-Patent Literature 2 corresponds to the acoustic signal expressing the reference sound, and the "degraded signal Y(t)" described therein corresponds to the acoustic signal expressing the evaluation target sound.

<In-Car Communication: ICC System>

ICC system is one application of a loudspeaker hands-free communication system, and is a technique that supports communication through microphones and speakers between occupants sitting in respective seats inside a vehicle. A terminal provided with at least one microphone and at least one speaker is disposed in proximity to each seat, a communication is achieved by having each terminal transmit and receive voice signals through a voice communication network set up inside the vehicle. In other words, a voice signal picked up by a microphone disposed in proximity to a first seat is emitted from a speaker disposed in proximity to a second seat, and a voice signal picked up by a microphone disposed in proximity to the second seat is emitted from a speaker disposed in proximity to the first seat, thereby achieving a communication between the occupant in the first seat and the occupant in the second seat. Note that a space in which at least one microphone and at least one speaker is disposed and in which at least one sound source (for example, an occupant of a vehicle) may exist is referred to as an "acoustic region". In other words, in ICC system, a plurality of acoustic regions is preset inside the target vehicle, and at least one seat is disposed in each acoustic region.

<Acoustic Quality Evaluation System>

Figure 2:
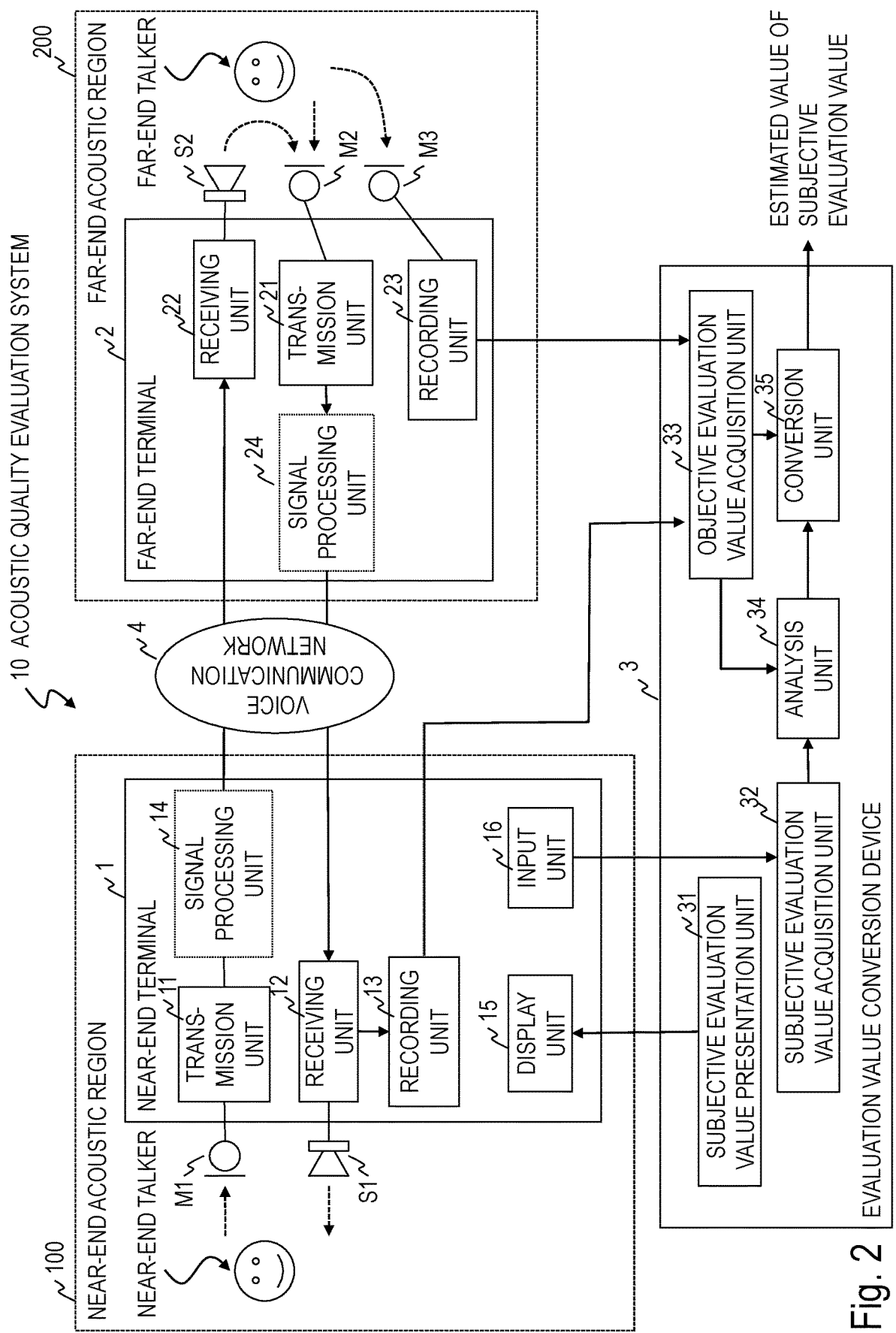
FIG. 2 is a diagram illustrating an example of a functional configuration of an acoustic quality evaluation system.

An acoustic quality evaluation system according to the embodiment is an information communication system for converting an objective evaluation value obtained through PESQ into a subjective evaluation value obtained through a conversational test. As illustrated in FIG. 2, an acoustic quality evaluation system 10 according to the embodiment includes a near-end terminal 1 used by a near-end talker, a far-end terminal 2 used by a far-end talker, and an evaluation value conversion device 3. In the acoustic quality evaluation system 10, a near-end acoustic region 100 in which the near-end talker and the near-end terminal 1 exist and a far-end acoustic region 200 in which the far-end talker and the far-end terminal 2 exist are predefined. The near-end terminal 1 is provided with at least a transmission unit 11, a receiving unit 12, a recording unit 13, a display unit 15, and an input unit 16, and furthermore may be provided with a signal processing unit 14. The far-end terminal 2 is provided with at least a transmission unit 21, a receiving unit 22, and a recording unit 23, and furthermore may be provided with a signal processing unit 24. The evaluation value conversion device 3 is provided with a subjective evaluation value presentation unit 31, a subjective evaluation value acquisition unit 32, an objective evaluation value acquisition unit 33, an analysis unit 34, and a conversion unit 35. An acoustic quality evaluation method according to the embodiment is achieved by causing the acoustic quality evaluation system 10 to process the steps illustrated as an example in FIGS. 3 and 7.

In the following description, the near-end talker who uses the near-end terminal 1 is treated as the evaluator who provides a sample of a subjective evaluation value and the far-end talker who uses the far-end terminal 2 is treated as the party on the other end of the communication to be subjectively evaluated, but the near-end talker and the far-end talker may also evaluate the same call at the same time. In this case, the near-end talker and the far-end talker act as both the evaluator and the party on the other end. In this occasion, the near-end terminal 1 and the far-end terminal 2 take the same functional configuration, and the far-end terminal 2 is additionally provided with a display unit and an input unit. Also, the following description presupposes the evaluation of the acoustic quality of a call between the two parties of the near-end terminal 1 and the far-end terminal 2, but a plurality of far-end terminals 2 may also exist, and conferencing telephony among the three or more parties of the near-end terminal 1 and the plurality of far-end terminals 2 may also be evaluated.

The near-end terminal 1 and the far-end terminal 2 are connected through a voice communication network 4. The evaluation value conversion device 3 is connected to the near-end terminal 1 and the far-end terminal 2 through a network that is not illustrated. However, if the voice communication network 4 is logically divisible into a communication channel for voice and a communication channel for data by bandwidth control or the like, the near-end terminal 1, the far-end terminal 2, and the evaluation value conversion device 3 may also be connected through the voice communication network 4. The voice communication network 4 is a circuit-switched or packet-switched network configured to enable connected devices to communicate with each other, and more particularly, is configured on the assumption of voice communication. Specifically, the voice communication network 4 may be configured by a network such as the Internet, a wide area network (WAN), a local area network (LAN), a dedicated line, the public switched telephone network, or a mobile phone communication network.

The near-end terminal 1 and the far-end terminal 2 are special devices configured by loading a special program into a publicly known or special-purpose computer including components such as a central processing unit (CPU) and main memory (random access memory (RAM)), for example. The near-end terminal 1 and the far-end terminal 2 execute processes under the control of the central processing unit, for example. Data inputted into the near-end terminal 1 and the far-end terminal 2 and data obtained by the processes are stored in the main memory, and data stored in the main memory is read out to the central processing unit as needed and used in other processes, for example. At least a portion of the near-end terminal 1 and the far-end terminal 2 may be configured by hardware such as an integrated circuit. Specifically, the near-end terminal 1 and the far-end terminal 2 are information processing devices provided with a voice transmitting/receiving function and a data communication function, such as a mobile terminal like a smartphone or a tablet, or a desktop or laptop personal computer.

The evaluation value conversion device 3 is a special device configured by loading a special program into a publicly known or special-purpose computer including components such as a central processing unit (CPU) and main memory (random access memory (RAM)), for example. The evaluation value conversion device 3 executes processes under the control of the central processing unit, for example. Data inputted into the evaluation value conversion device 3 and data obtained by the processes are stored in the main memory, and data stored in the main memory is read out to the central processing unit as needed and used in other processes, for example. At least a portion of the evaluation value conversion device 3 may be configured by hardware such as an integrated circuit. Each storage unit provided in the evaluation value conversion device 3 may be configured by main memory such as random access memory (RAM), an auxiliary storage device configured by a hard disk, an optical disc, or semiconductor memory elements such as flash memory, or middleware such as a relational database or a key-value store, for example. Specifically, the evaluation value conversion device 3 is an information processing device provided with a data communication function and a data processing function, such as a desktop or rackmount server computer.

Figure 3:
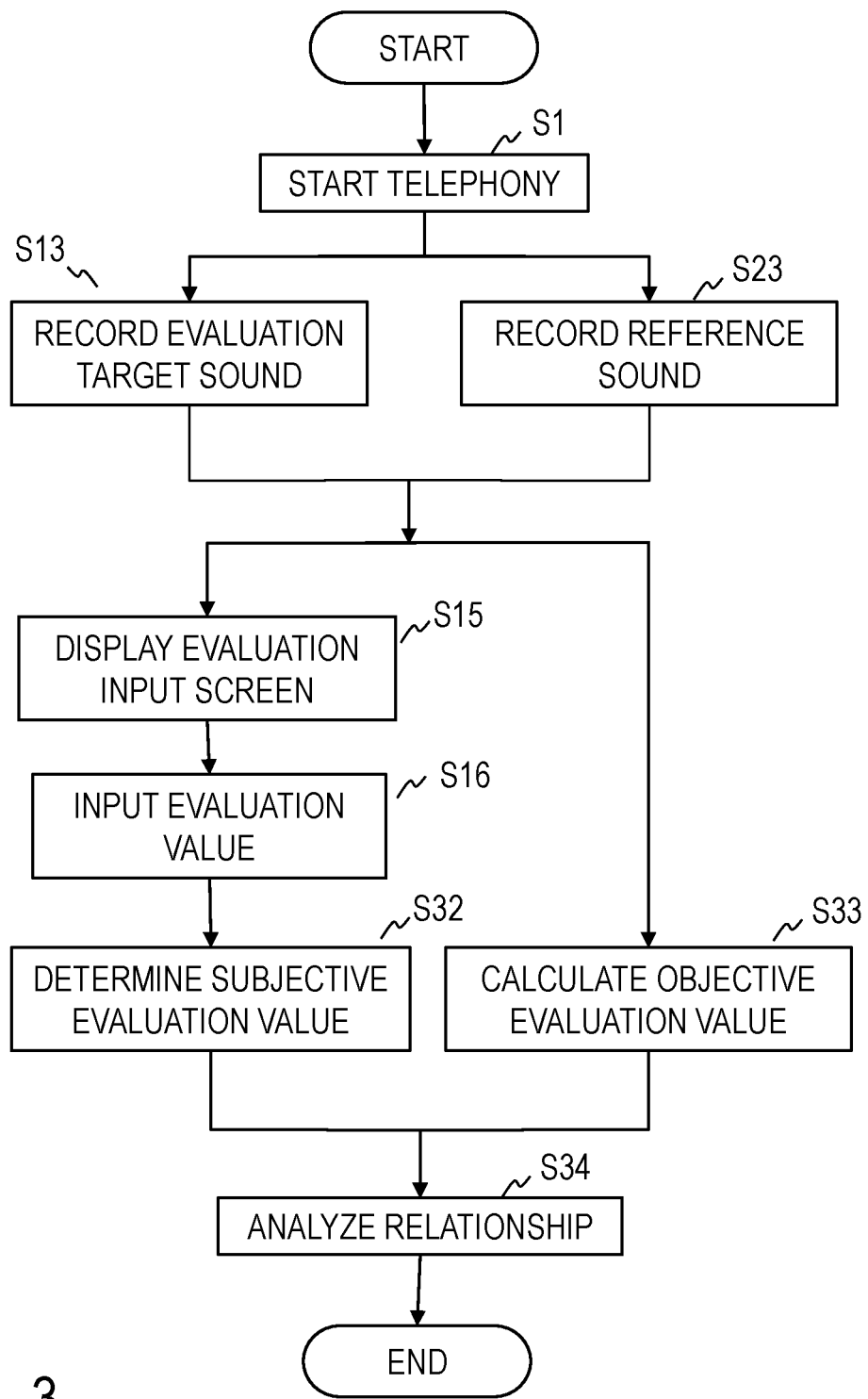
FIG. 3 is a diagram illustrating an example of a processing procedure of an acoustic quality evaluation method.
Figure 7:
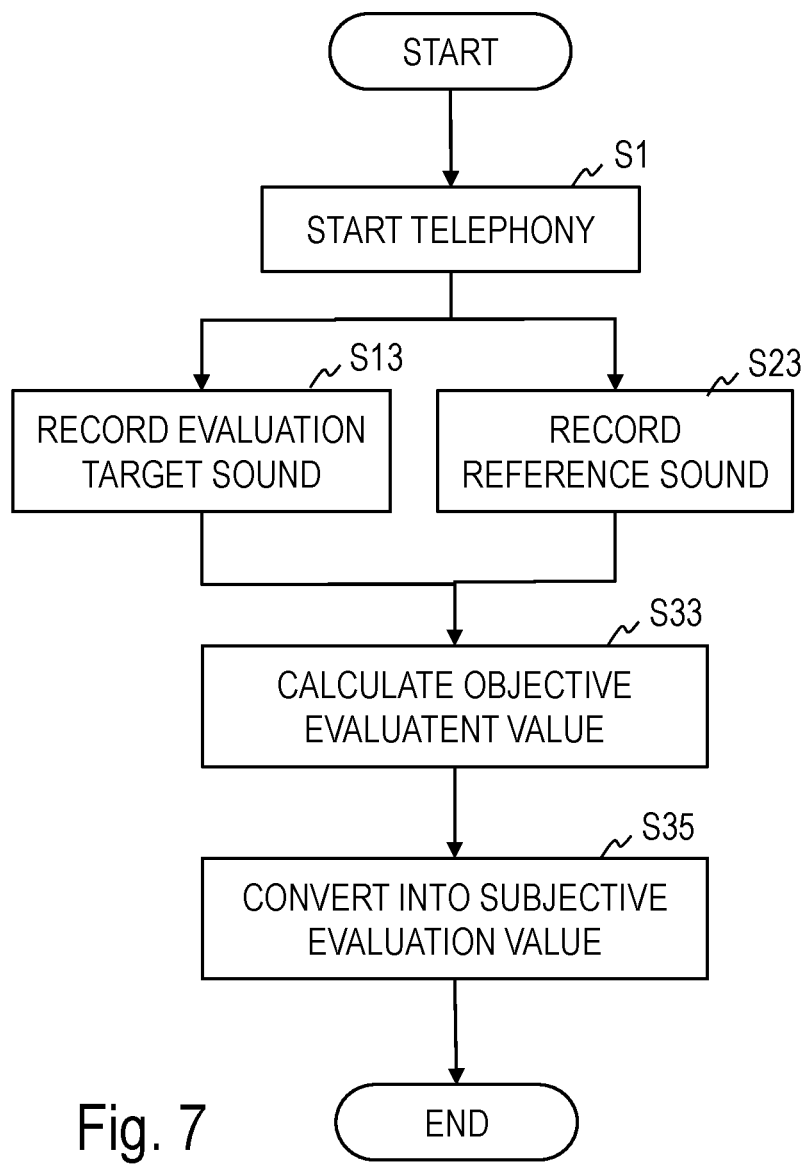
FIG. 7 is a diagram illustrating an example of a processing procedure of an acoustic quality evaluation method.

The acoustic quality evaluation method according to the embodiment includes two stages of processing. The first stage is a process that analyzes the relationship between an objective evaluation value and a subjective evaluation value to convert an objective evaluation value into a subjective evaluation value. The second stage is a process that converts an objective evaluation value calculated from an acoustic signal of recorded speech into a subjective evaluation value on the basis of the relationship between the objective evaluation value and the subjective evaluation value obtained in the first stage. FIG. 3 is a diagram illustrating an example of the relationship analysis process of the first stage. FIG. 7 is a diagram illustrating an example of the evaluation value conversion process of the second stage.

<Relationship Analysis Process>

Hereinafter, FIG. 3 will be referenced to explain the process of analyzing the relationship between an objective evaluation value and a subjective evaluation value as part of the acoustic quality evaluation method according to the embodiment.

In step S1, the near-end terminal 1 and the far-end terminal 2 start a call of which the acoustic quality is to be evaluated. First, the near-end terminal 1 calls the far-end terminal 2 in accordance with an operation by the near-end talker. The far-end terminal 2 answers the call from the near-end terminal 1 in accordance with an operation by the far-end talker. With this arrangement, a call is established between the near-end terminal 1 and the far-end terminal 2. Although an example of the near-end terminal 1 calling the far-end terminal 2 is given here, a call may also be established by having the far-end terminal 2 call the near-end terminal 1.

When the call is established, speech uttered by the near-end talker is converted into an acoustic signal by a microphone M1 of the near-end terminal 1, and the transmission unit 11 transmits the acoustic signal to the receiving unit 22 of the far-end terminal 2. In the case where the near-end terminal 1 is provided with the signal processing unit 14, the signal processing unit 14 performs signal processing including at least one of echo cancellation processing and noise cancellation processing on the acoustic signal transmitted to the far-end terminal 2. The receiving unit 22 of the far-end terminal 2 outputs the acoustic signal received from the transmission unit 11 of the near-end terminal 1 from a speaker S2 of the far-end terminal 2. Speech uttered by the far-end talker is converted into an acoustic signal by a microphone M2 of the far-end terminal 2, but at this time, the wraparound voice signal of the near-end talker outputted from the speaker S2 of the far-end terminal 2 is superimposed onto the speech of the far-end talker and converted into an acoustic signal. The transmission unit 21 of the far-end terminal 2 transmits the acoustic signal to the receiving unit 12 of the near-end terminal 1. In the case where the far-end terminal 2 is provided with the signal processing unit 24, the signal processing unit 24 performs signal processing including at least one of echo cancellation processing and noise cancellation processing on the acoustic signal transmitted to the near-end terminal 1. The receiving unit 12 of the near-end terminal 1 outputs the acoustic signal received from the transmission unit 21 of the far-end terminal 2 from a speaker S1 of the near-end terminal 1. In this way, a communication between the near-end talker and the far-end talker is achieved through the call established between the near-end terminal 1 and the far-end terminal 2.

In step S13, the recording unit 13 of the near-end terminal 1 records the acoustic signal that the receiving unit 12 of the near-end terminal 1 outputs from the speaker S1, and transmits the recorded acoustic signal to the evaluation value conversion device 3 as an acoustic signal expressing the evaluation target sound (hereinafter referred to as the "evaluation target acoustic signal"). The evaluation value conversion device 3 inputs the evaluation target acoustic signal received from the recording unit 13 of the near-end terminal 1 into the objective evaluation value acquisition unit 33.

In step S23, the recording unit 23 of the far-end terminal 2 converts sound inputted into a microphone M3 of the far-end terminal 2 into an acoustic signal, and transmits the acoustic signal to the evaluation value conversion device 3 as an acoustic signal expressing a reference sound (hereinafter referred to as the "reference acoustic signal"). The evaluation value conversion device 3 inputs the reference acoustic signal received from the recording unit 23 of the far-end terminal 2 into the objective evaluation value acquisition unit 33.

The recording unit 23 may also be provided in the near-end terminal 1. In this case, the microphone M3 is disposed inside the acoustic region in which the far-end terminal 2 exists, and an audio cable running from the microphone M3 to the acoustic region in which the near-end terminal 1 exists is used to connect the microphone M3 to the recording unit 23 provided in the near-end terminal 1. This arrangement makes it possible to record the speech uttered by the far-end talker directly with the recording unit 23 provided in the near-end terminal 1.

In step S15, the subjective evaluation value presentation unit 31 of the evaluation value conversion device 3 transmits a control signal for causing the display unit 15 of the near-end terminal 1 to display an evaluation input screen through which the near-end talker inputs an evaluation of the acoustic quality. The display unit 15 of the near-end terminal 1 displays the evaluation input screen in accordance with the received control signal. On the evaluation input screen, evaluation categories classified into a plurality of levels are displayed for each of a plurality of predetermined evaluation perspectives. Evaluation values corresponding to the quality for each evaluation perspective are assigned to these evaluation categories. The evaluation input screen shall be so set that only a single evaluation category is selectable for each evaluation perspective.

For example, the evaluation perspectives include the three perspectives of "ease of hearing other party's voice", "noisiness", and "return of one's own voice". For the evaluation perspective of "ease of hearing other party's voice", for example, the five levels of "extremely easy to hear", "no problems with hearing", "slightly difficult to hear", "difficult to hear", and "extremely difficult to hear" are set as the evaluation categories, and the evaluation values 5, 4, 3, 2, 1 are respectively assigned to the evaluation categories in order. For the evaluation perspective of "noisiness", for example, the five levels of "no noise at all", "a little noise", "noise present", "very noisy", and "extremely noisy" are set as the evaluation categories, and the evaluation values 5, 4, 3, 2, 1 are respectively assigned to the evaluation categories in order. For the evaluation perspective of "return of one's own voice", for example, the five levels of "no return of one's own voice at all", "a little return of one's own voice", "some return of one's own voice", "loud return of one's own voice", and "extremely loud return of one's own voice" are set as the evaluation categories, and the evaluation values 5, 4, 3, 2, 1 are respectively assigned to the evaluation categories in order. The following table summarizes the relationships between the evaluation perspectives, the evaluation categories, and the evaluation values illustrated in the above example.

TABLE 1

| Ease of hearing other party's voice | Noisiness | Return of one's own voice | Evaluation value |
|---|---|---|---|
| Extremely easy to hear | No noise at all | No return of one's own voice at all | 5 |
| No problems with hearing | A little noise | A little return of one's own voice | 4 |
| Slightly difficult to hear | Noise present | Some return of one's own voice | 3 |
| Difficult to hear | Very noisy | Loud return of one's own voice | 2 |
| Extremely difficult to hear | Extremely noisy | Extremely loud return of one's own voice | 1 |

FIG. 4 illustrates an example of the evaluation input screen for inputting an evaluation on the basis of the evaluation categories in the above example. An evaluation input screen 130 is provided with an area 131-1 corresponding to the evaluation perspective of "ease of hearing other party's voice", an area 131-2 corresponding to the evaluation perspective of "noisiness", and an area 131-3 corresponding to the evaluation perspective of "return of one's own voice". In the area 131-1, labels 132-1 expressing the evaluation categories for "ease of hearing other party's voice" divided into five levels are displayed, and five buttons 133-1 are provided in a one-to-one correspondence with the evaluation categories. The buttons 133-1 have a function of switching the selected state, and are set such that only one button inside the area 131-1 is selectable. For example, the buttons 133-1 are option buttons set as a group inside the area 131-1. The area 131-2 and the area 131-3 are similarly provided with labels 132-2 and 132-3 as well as buttons 133-2 and 133-3. FIG. 4 is one example of the design of the evaluation input screen, and the design may be altered in consideration of factors such as convenience of operation.

In step S16, the near-end talker listens to the speech outputted from the speaker S1 of the near-end terminal 1, and evaluates the acoustic quality. The evaluation of the acoustic quality is performed by selecting the evaluation category thought to be most applicable on the basis of one's own subjective experience for each evaluation perspective on the evaluation input screen displayed by the display unit 15. In the case of the example of the evaluation input screen 130 in FIG. 4, the most applicable evaluation category for "ease of hearing other party's voice" is selected, and the button 133-1 corresponding to the label 132-1 is selected. Similarly, the buttons 133-2 and 133-3 respectively corresponding to the most applicable evaluation category for "noisiness" and the most applicable evaluation category for "return of one's own voice" are selected. After selecting evaluation categories for all evaluation perspectives, the near-end talker presses a confirmation button 134. The input unit 16 of the near-end terminal 1 transmits the evaluation value assigned to each selected evaluation category according to the selection states on the evaluation input screen 130 to the evaluation value conversion device 3. The evaluation value conversion device 3 inputs the evaluation values for each of the evaluation perspectives received from the input unit 16 of the near-end terminal 1 into the subjective evaluation value acquisition unit 32.

In step S32, the subjective evaluation value acquisition unit 32 of the evaluation value conversion device 3 determines a single subjective evaluation value regarding the acoustic quality on the basis of the evaluation values for each of the evaluation perspectives received from the input unit 16 of the near-end terminal 1. Specifically, the lowest evaluation value among the evaluation values for each of the evaluation perspectives is determined as the subjective evaluation value regarding the acoustic quality. In the case of the example in FIG. 4, the evaluator has selected "extremely easy to hear" (evaluation value 5) for "ease of hearing other party's voice", "noise present" (evaluation value 3) for "noisiness", and "a little return of one's own voice" (evaluation value 4) for "return of one's own voice", and therefore the lowest evaluation value "3" is determined as the subjective evaluation value. The subjective evaluation value acquisition unit 32 outputs the determined subjective evaluation value to the analysis unit 34.

In step S33, the objective evaluation value acquisition unit 33 of the evaluation value conversion device 3 calculates an objective evaluation value corresponding to the evaluation target acoustic signal received from the recording unit 13 and the reference acoustic signal received from the recording unit 23. The objective evaluation value is the PESQ value described in Non-Patent Literature 2, for example. The process of calculating the PESQ value includes a process of correcting the time lag between the evaluation target acoustic signal and the reference acoustic signal. The objective evaluation value acquisition unit 33 outputs the calculated objective evaluation value to the analysis unit 34.

In step S34, the analysis unit 34 of the evaluation value conversion device 3 analyzes a linear relationship between the subjective evaluation value received from the subjective evaluation value acquisition unit 32 and the objective evaluation value received from the objective evaluation value acquisition unit 33. At this time, by obtaining subjective evaluation values and objective evaluation values to be used in the analysis from conversations by various combinations of a plurality of evaluators and a plurality of parties on the other end, the analysis unit 34 performs a statistical analysis with reduced dependence on the reference acoustic signal and evaluation target acoustic signal and with reduced dependence on individual variations among the evaluators. The analysis unit 34 sets information expressing a linear relationship obtained by the analysis in the conversion unit 35. Here, the information expressing a linear relationship refers to information such as a linear function F that expresses a line with a predetermined slope "a" and a parameter that specifies the linear function F.

Figure 5:
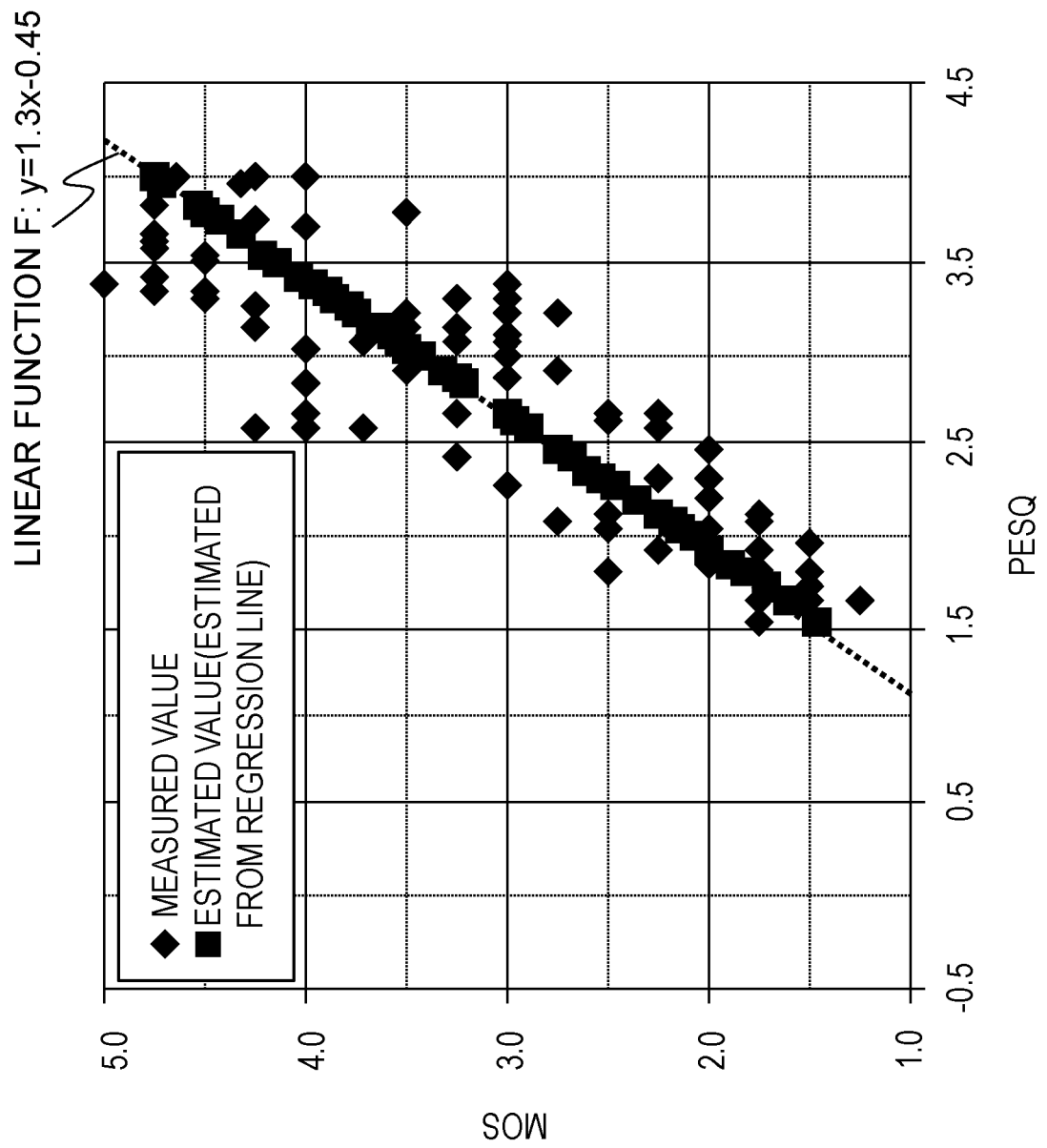
FIG. 5 is a diagram illustrating an example of the relationship between subjective evaluation values and objective evaluation values.

FIG. 5 is a graph illustrating the relationship between subjective evaluation values and objective evaluation values obtained according to the method described above. The vertical axis represents the subjective evaluation value (mean opinion score (MOS)) according to the conversational tests, and the horizontal axis represents the objective evaluation value (PESQ). The diamond-shaped marks denote measurement values from conversational tests, while the square-shaped marks on the dashed line denote estimated values based on the linear relationship thereof (values estimated by regression analysis). As the diagram demonstrates, the relationship between the MOS value and the PESQ value can be approximated with a linear relationship. The linear function F expressed by the regression line illustrated in FIG. 5 is a linear function y=ax+b having a slope "a" and an intercept "b", where "x" represents the PESQ value and "y" represents the MOS value. Also, "a" is 1.3 or approximately 1.3, and "b" is −0.45 or approximately −0.45. Note that approximately "α" means a value belonging to a range from $\alpha-\delta_1$ or greater to $\alpha-\delta_2$ or less. Here, $\delta_1$ and $\delta_2$ are positive values, and $\delta_1$ may or may not be equal to $\delta_2$. An example of $\delta_1$ and $\delta_2$ is the value of 20% of $|\alpha|$. That is, "a" is a value in the range from 1.04 to 1.56, and "b" is a value in the range from −0.36 to −0.54.

To obtain a linear relationship between a subjective evaluation value and an objective evaluation value, it is necessary for the subjective evaluation value and the objective evaluation value to be related to the same conversation. At this time, if the conversation in question is overly long, the subjective evaluation value and the objective evaluation value may not be in agreement and a suitable linear relationship may not be obtained in some cases. To avoid this situation, it is beneficial to set an appropriate length for the conversation to be evaluated. The appropriate length may be set to approximately 20 seconds for example, or may be set to a length conforming to a desired standard.

In conventional conversational tests, the subjective evaluation value is determined by an evaluation category divided into five levels, but in the present embodiment, evaluation categories classified into a plurality of levels for each of a plurality of evaluation perspectives are used, and the lowest evaluation value is determined as the subjective evaluation value. In recent years, telephony environments with poor acoustic quality such as smartphones and mobile phones has become popular, and because evaluators accustomed to telephony environments with poor acoustic quality have lower criteria of acoustic quality, such evaluators have a strong tendency to give high evaluation values, such as judging the acoustic quality to be good if the other party's voice is audible, for example. Consequently, in the case of performing a subjective evaluation with the conversational tests of the related art, there is a problem in that the results are biased toward high evaluation values, and appropriate evaluation values are not obtained. The inventor of the present invention discovered that this problem can be avoided by introducing a plurality of evaluation perspectives and treating the lowest evaluation value from among the evaluation values selected for each of the evaluation perspectives as the subjective evaluation value, like in the acoustic quality evaluation system according to the embodiment. Particularly, in an evaluation related to ICC system, there expected to be little noise when the vehicle is in halt, and much running noise and environmental noise when the vehicle is traveling. In other words, the communication quality of ICC system is expected to be high in some cases and low in other cases. Consequently, it is necessary to acquire an appropriate evaluation value irrespectively of whether the communication quality is high or low. In particular, by configuring the evaluation values as described above, an effect of being able to acquire appropriate subjective evaluation values is anticipated.

FIG. 6 illustrates experimental results of evaluation tests by the acoustic quality evaluation system according to the embodiment. In the tests, four experimental conditions I to IV were set, and four evaluators performed conversational tests three times each over four days while changing the party on the other end under each set of experimental conditions. The experimental conditions I are conditions in which the sound is clearly good, and evaluation values of 4 or 5 are expected to be assigned (in other words, it is expected that no one would assign an evaluation value of 1 or 2). The experimental conditions II are conditions in which the sound is clearly poor, and evaluation values of 1 or 2 are expected to be assigned (in other words, it is expected that no one would assign an evaluation value of 4 or 5). The experimental conditions III are conditions in which the sound is relatively good among sounds that most people would rate as normal, and evaluation values of 3 or 4 are expected to be assigned (in other words, it is expected that no one would assign an evaluation value of 1). The experimental conditions IV are conditions in which the sound is relatively poor among sounds that most people would rate as normal, and evaluation values of 2 or 3 are expected to be assigned (in other words, it is expected that no one would assign an evaluation value of 5). For each of such experimental conditions, conventional and typical evaluation categories ("Excellent", "Good", "Fair", "Poor", "Bad") and the evaluation categories of the embodiment (five levels of evaluation categories set for each of three evaluation perspectives) were used to perform conversational tests, and the evaluation values for each were averaged. As illustrated in FIG. 6, with the evaluation categories of the embodiment, evaluation values within the range of expected evaluation values were obtained, but with the conventional evaluation categories, higher-than-expected evaluation values were assigned in the experimental conditions II and IV especially for which low evaluation values were expected to be assigned. In other words, the above experiments are considered to demonstrate that appropriate evaluation values are obtained by using the evaluation categories of the embodiment, even if the evaluators have a tendency to assign high evaluation values with the conventional evaluation categories.

<Evaluation Value Conversion Process>

Hereinafter, FIG. 7 will be referenced to explain the process of converting an objective evaluation value into a subjective evaluation value as part of the acoustic quality evaluation method according to the embodiment. Note that since the process from step S1 to step S33 is similar to the relationship analysis process described above, a description is omitted here.

In step S35, the conversion unit 35 of the evaluation value conversion device 3 obtains an estimated value of the subjective evaluation value by linearly converting the objective evaluation value received from the objective evaluation value acquisition unit 33 into a subjective evaluation value on the basis of the preset linear relationship from the analysis unit 34. For example, the conversion unit 35 substitutes the objective evaluation value for "x" of the preset linear function y=ax+b from the analysis unit 34, and treats the result obtained thereby as an estimated value of the subjective evaluation value. The conversion unit 35 treats the obtained estimated value of the subjective evaluation value as the output of the evaluation value conversion device 3.

<Modification 1>

Figure 8:
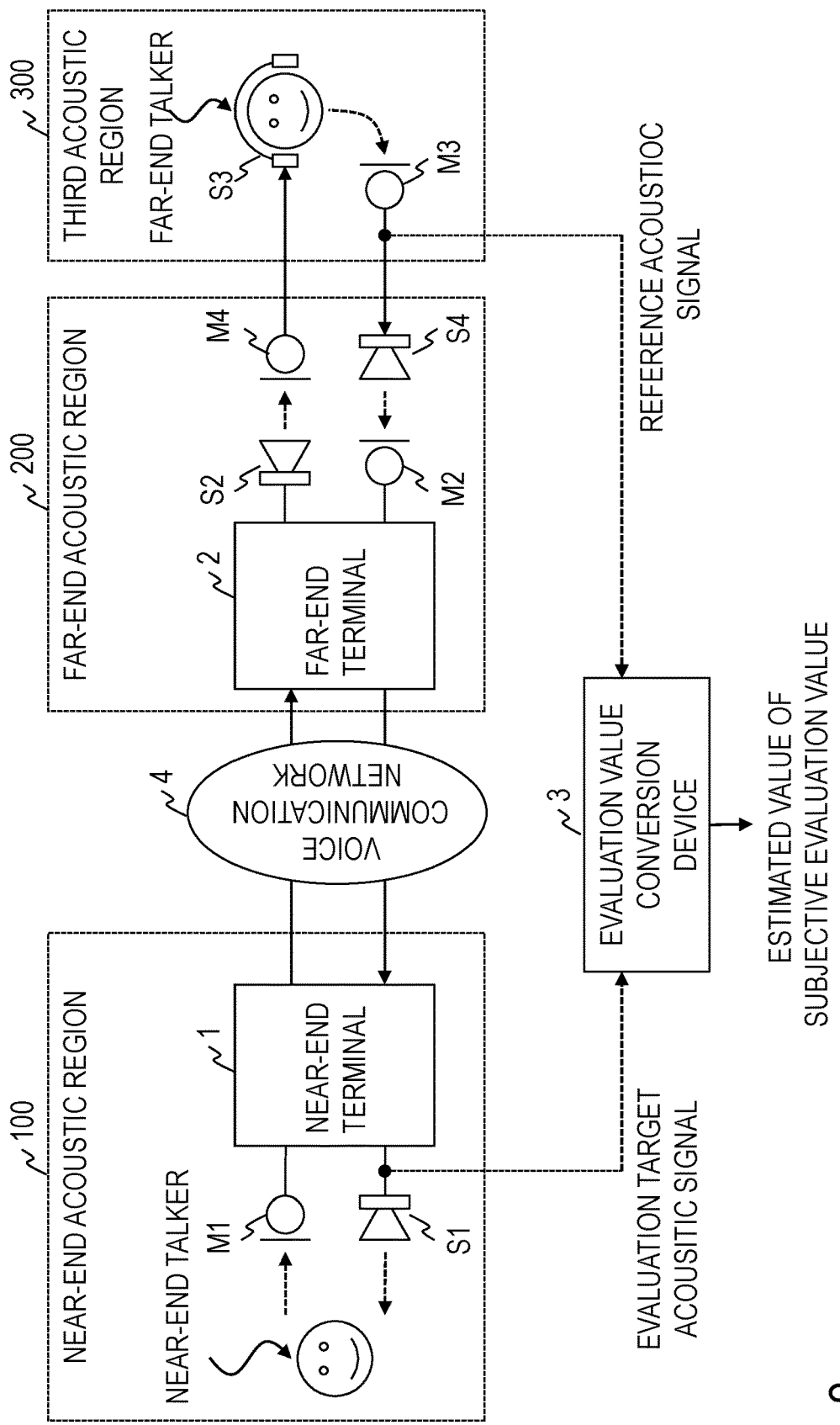
FIG. 8 is a diagram illustrating an example of a functional configuration of an acoustic quality evaluation system according to Modification 1.

FIG. 8 illustrates Modification 1 of the acoustic quality evaluation system according to the embodiment. The acoustic quality evaluation system according to Modification 1 is characterized in that the acoustic region where the far-end talker exists and the acoustic region where the far-end terminal 2 exists are separated. Hereinafter, the differences from the acoustic quality evaluation system according to the embodiment will be described primarily. In the far-end acoustic region 200, the far-end terminal 2 exists similarly to the embodiment, but the far-end talker exists in a third acoustic region 300 different from the far-end acoustic region 200. The speaker S2 and the microphone M2 provided in the far-end terminal 2 are disposed in the far-end acoustic region 200 similarly to the embodiment, but the microphone M3 that records speech uttered by the far-end talker is disposed in the third acoustic region 300. The far-end talker wears a closed speaker S3 such as headphones. In the far-end acoustic region 200, a speaker S4 connected to the microphone M3 by an audio cable or the like and a microphone M4 connected to the closed speaker S3 by an audio cable or the like are disposed. Speech by the near-end talker outputted from the speaker S2 of the far-end terminal 2 is picked up by the microphone M4 in the far-end acoustic region 200 and emitted from the closed speaker S3 in the third acoustic region 300, and then listened to by the far-end talker. The speech uttered by the far-end talker is picked up by the microphone M3 in the third acoustic region 300 and emitted from the speaker S4 in the far-end acoustic region 200. Furthermore, speech by the far-end talker emitted from the speaker S4 is converted into an acoustic signal by the microphone M2 of the far-end terminal 2 and emitted from the speaker S1 of the near-end terminal 1, and then listened to by the near-end talker. At this time, the evaluation target sound in an objective evaluation is recorded when outputted from the speaker S1 of the near-end terminal 1, and the reference sound is recorded when inputted into the microphone M3.

In the case where the speaker S2 on the far-end talker side and the microphone M3 for recording the reference sound exist in the same acoustic region like in the embodiment (FIG. 2), the wraparound voice signal of the near-end talker outputted from the speaker S2 may be recorded superimposed onto the reference sound, or ambient noise on the far-end talker side may be recorded superimposed onto the reference sound. An unwanted acoustic signal not based on the voice signal from the far-end talker, such as the wraparound voice signal of the near-end talker and ambient noise, which is also referred to as interfering noise, is a factor impeding the accurate calculation of an objective evaluation value when interfering noise is mixed into the reference sound. By causing the far-end talker to use a closed speaker to listen to the speech by the near-end talker and recording the reference sound in an acoustic region different from the far-end terminal like in Modification 1, the amount of interfering noise superimposed onto the reference sound can be reduced. This arrangement makes it possible to acquire a more accurate objective evaluation value, and a more appropriate linear relationship can be obtained.

<Modification 2>

A method of evaluating acoustic quality of the ICC system will be described with reference to FIG. 9. ICC system uses microphones 1F, 1R and speakers 2F, 2R mounted on a vehicle 90 to support communication between occupants sitting in respective seats. For example, a voice signal picked up by the microphone 1F (1R) is subjected to signal processing such as echo cancellation and gain control, and then emitted from the speaker 2R (2F). The microphones 1 may be disposed with respect to each row of seats or with respect to each seat inside the car. As illustrated by the example in FIG. 9, the microphones 1 may also be disposed only in front of the first row (on the dashboard or near the rear-view mirror, for example) and between the second and third rows (on a floor surface or ceiling surface between the middle seats and the rear seats, for example).

When evaluating acoustic quality of the ICC system, an evaluation is made between seats or between rows. Hereinafter, a method of estimating a subjective evaluation value between a driver's seat 91 and a rear seat 97 without using an evaluator will be described as an example of making an evaluation between seats. A microphone 3F and a speaker 4F are installed in the driver's seat 91, and a microphone 3R and a speaker 4R are installed in the rear seat 97. Each speaker is disposed at a position corresponding to the position of a person's mouth when a person is sitting in the seat. In other words, each speaker is installed at left and right center and frontward of the seat. Each microphone is disposed at a position corresponding to the position of a person's ear when a person is sitting in the seat. In other words, each microphone is installed in the center of the front-back direction and to the left or the right of the seat. For example, the speaker 4F is preferably installed at a position corresponding to the mouth of an evaluator and in a direction that emits sound in the front direction assuming the evaluator is sitting in the driver's seat, while the microphone 3F is preferably installed at a position corresponding to the left ear or the right ear of the evaluator assuming that the evaluator is sitting in the driver's seat. Two or more microphones may be installed in each seat, and may be installed at two locations corresponding to the left and right ears of an evaluator, for example.

Inside the vehicle 90 with microphones and speakers disposed as described above, a prerecorded voice signal is emitted from the speaker 4R installed in the rear seat 97. The voice signal emitted from the speaker 4R is picked up by the microphone 1R, subjected to signal processing such as echo cancellation and gain control, and then emitted from the speaker 2F. The voice signal emitted from the speaker 2F is picked up by the microphone 3F installed in the driver's seat 91. An objective evaluation value is obtained by treating the prerecorded voice signal as the reference acoustic signal and treating the voice signal picked up by the microphone 3F as the evaluation target acoustic signal. By converting the objective evaluation value obtained in this way on the basis of the linear function F calculated in advance, a subjective evaluation value can be estimated. Although an example of an evaluation between the driver's seat 91 and the rear seat 97 is described here, seats and rows may be combined in any way.

By utilizing the present invention in this way, a subjective evaluation value can be obtained without using evaluators for different circumstances of a vehicle for which the evaluation of acoustic quality of the ICC system is necessary. Here, the circumstances of a vehicle refer to factors that create variations in the sounds picked up by the microphones installed in the vehicle, such as the vehicle being stopped or traveling, differences in speed if the vehicle is traveling, the windows being in an open or closed state, and the level of noise inside the car as typified by music or the like.

<Modification 3>

Modification 2 describes a method of evaluating acoustic quality of the ICC system by using the acoustic quality evaluation system 10 illustrated in FIG. 2. Here, the evaluation target acoustic signal is assumed to be a signal arriving via ICC system. However, with ICC system, a plurality of acoustic regions are set inside the same vehicle, and therefore a voice signal emitted from a speaker installed in one acoustic region may arrive at a microphone installed in another acoustic region directly, without going through ICC system. Consequently, in the evaluation of acoustic quality of the ICC system, it is also necessary to assume that a voice signal arriving by another acoustic pathway is included in the evaluation target acoustic signal. Also, Modification 2 assumes one-way single talk in which an occupant sitting in a first seat talks to an occupant sitting in a second seat. However, because the purpose of ICC system is to support communication between occupants inside a vehicle, it is also necessary to consider two-way double talk in which the occupant sitting in the second seat also talks to the occupant sitting in the first seat at the same time. In other words, the acoustic quality evaluation system according to Modification 3 evaluates the quality of speech in one-way or two-way communication performed using ICC system.

Figure 10:
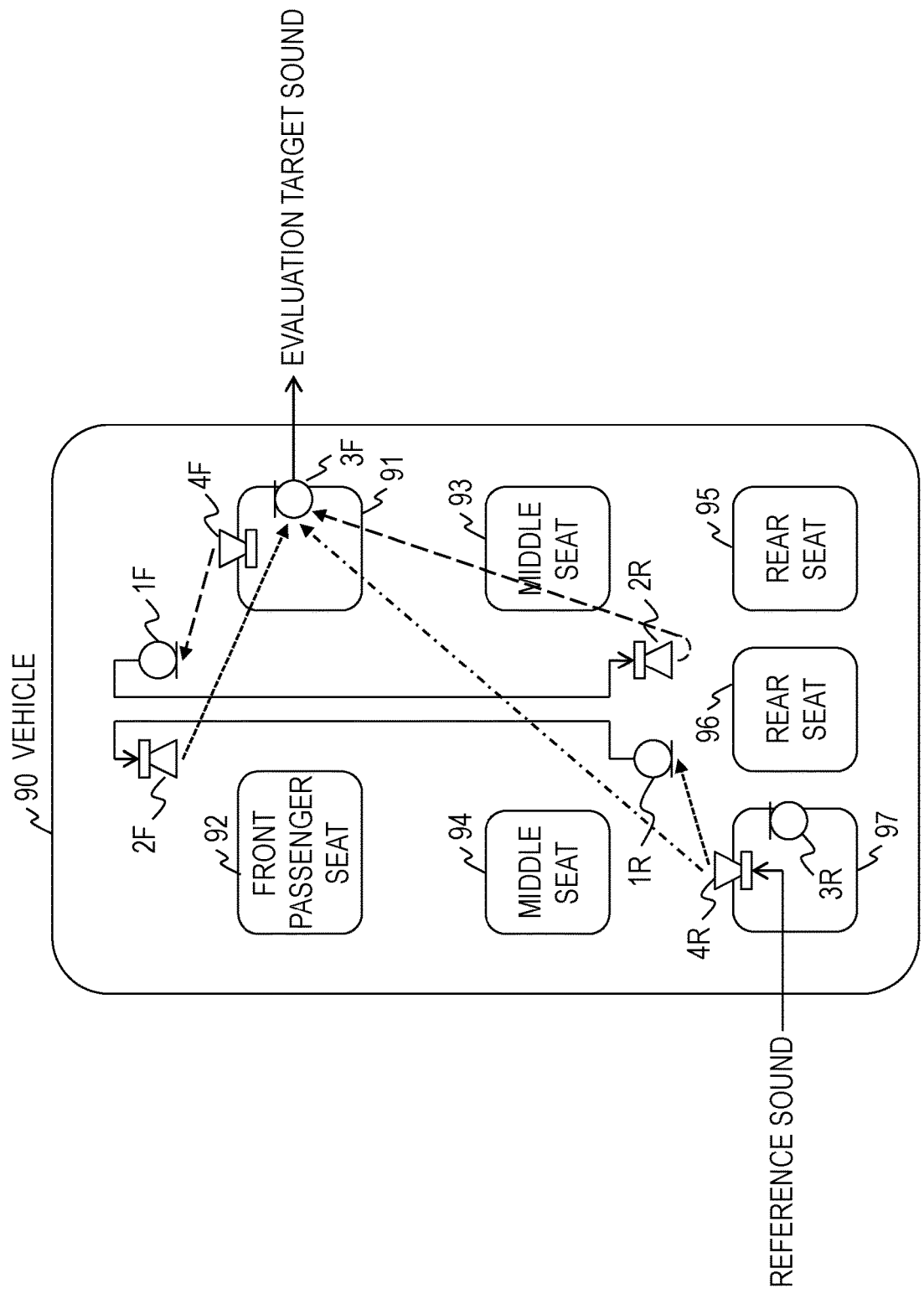
FIG. 10 is a diagram for explaining an example of an evaluation of acoustic quality of the ICC system.

FIG. 10 illustrates acoustic pathways anticipated in Modification 3. Here, the near-end talker (evaluator) is assumed to be sitting in the driver's seat 91, and the far-end talker (party on the other end) is assumed to be sitting in the rear seat 97. The dotted line illustrated in FIG. 10 (4R to 1R and 2F to 3F) is the acoustic pathway anticipated in Modification 2, and is the acoustic pathway by which the reference acoustic signal emitted from the speaker 4R arrives at the microphone 3F through ICC system. The dot-dash line illustrated in FIG. 10 (4R to 3F) is the acoustic pathway of direct sound, and is the acoustic pathway by which the reference acoustic signal emitted from the speaker 4R arrives at the microphone 3F directly, without going through ICC system. The dashed line illustrated in FIG. 10 (4F to 1F and 2R to 3F) is the acoustic pathway of anticipated double talk, and is the acoustic pathway by which the voice signal emitted from the speaker 4F is emitted from the speaker 2R through ICC system and arrives at the microphone 3F. In the acoustic pathway of anticipated double talk, the voice signal emitted from the speaker 2F is also picked up by the microphone 1F to produce an echo, and the component of the echo that is not completely eliminated is also assumed to be emitted from the speaker 2R.

Figure 11:
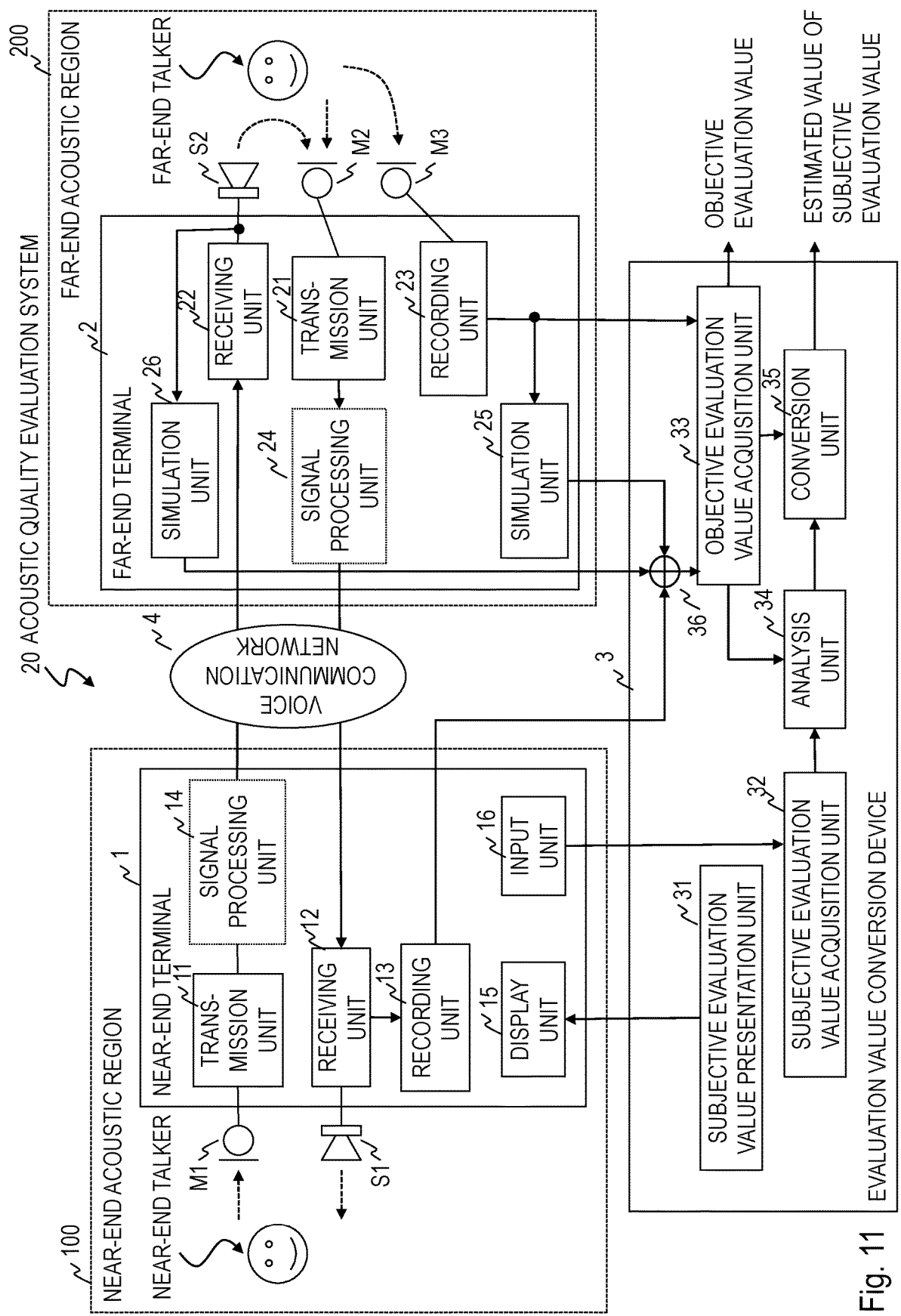
FIG. 11 is a diagram illustrating an example of a functional configuration of an acoustic quality evaluation system according to Modification 3.

As illustrated in FIG. 11, in an acoustic quality evaluation system 20 according to Modification 3, the far-end terminal 2 is further provided with two simulation units 25 and 26 while the evaluation value conversion device 3 is further provided with an addition unit 36 compared to the acoustic quality evaluation system 10 (FIG. 2) according to the embodiment. The simulation unit 25 accepts the acoustic signal outputted by the recording unit 23 as input, and transmits to the evaluation value conversion device 3 a simulated acoustic signal obtained by performing predetermined signal processing for applying the transmission characteristics of the acoustic pathway of direct sound. The simulation unit 26 accepts the acoustic signal outputted by the receiving unit 22 as input, and transmits to the evaluation value conversion device 3 a simulated acoustic signal obtained by performing predetermined signal processing for applying the transmission characteristics of the acoustic pathway of anticipated double talk. The evaluation value conversion device 3 inputs the acoustic signal received from the recording unit 23, the simulated acoustic signal received from the simulation unit 25, and the simulated acoustic signal received from the simulation unit 26 into the addition unit 36. The addition unit 36 combines the three inputted acoustic signals, and inputs the combined acoustic signal into the objective evaluation value acquisition unit 33 as the evaluation target acoustic signal. The objective evaluation value acquired by the objective evaluation value acquisition unit 33 may be outputted as the output of the evaluation value conversion device 3 as-is, or the linear conversion described above may be performed by the conversion unit 35 to acquire an estimated value of the subjective evaluation value.

The simulation units 25 and 26 receive an acoustic signal or a voice signal as input, and output a converted signal obtained by performing a conversion that applies the transmission characteristics of the respectively corresponding acoustic pathways. The conversion may be achieved by signal processing that applies the transmission characteristics between seats acquired in advance, or by hardware such as an attenuator in consideration of the distance between the seats and noise inside the car. In addition, the simulation units 25 and 26 may also be combined with a delayer that delays the signal in consideration of the speed of sound propagation through the space. If the distance between the seats in the vehicle is short enough for the delay difference to be negligible, it is also possible not to use a delayer and perform only the conversion process applying the transmission characteristics as described above. The simulation unit 25 and the simulation unit 26 have a common function in that they apply the transmission characteristics of an acoustic pathway. Consequently, in the case where the transmission characteristics of the respective acoustic pathways are identical (or similar), it is also possible to provide only a single simulation unit configured to perform the same conversion process on each of the input signals.

The acoustic quality evaluation system 20 according to Modification 3 evaluates the acoustic quality by adding components to the evaluation target acoustic signal, which components simulate the acoustic pathway originated due to the co-existence of the near-end acoustic region and the far-end acoustic region in the same space. By taking such a configuration, a precise evaluation of acoustic quality of the ICC system which supports communication inside the same vehicle can be achieved, for example.

<Modification 4>

Figure 9:
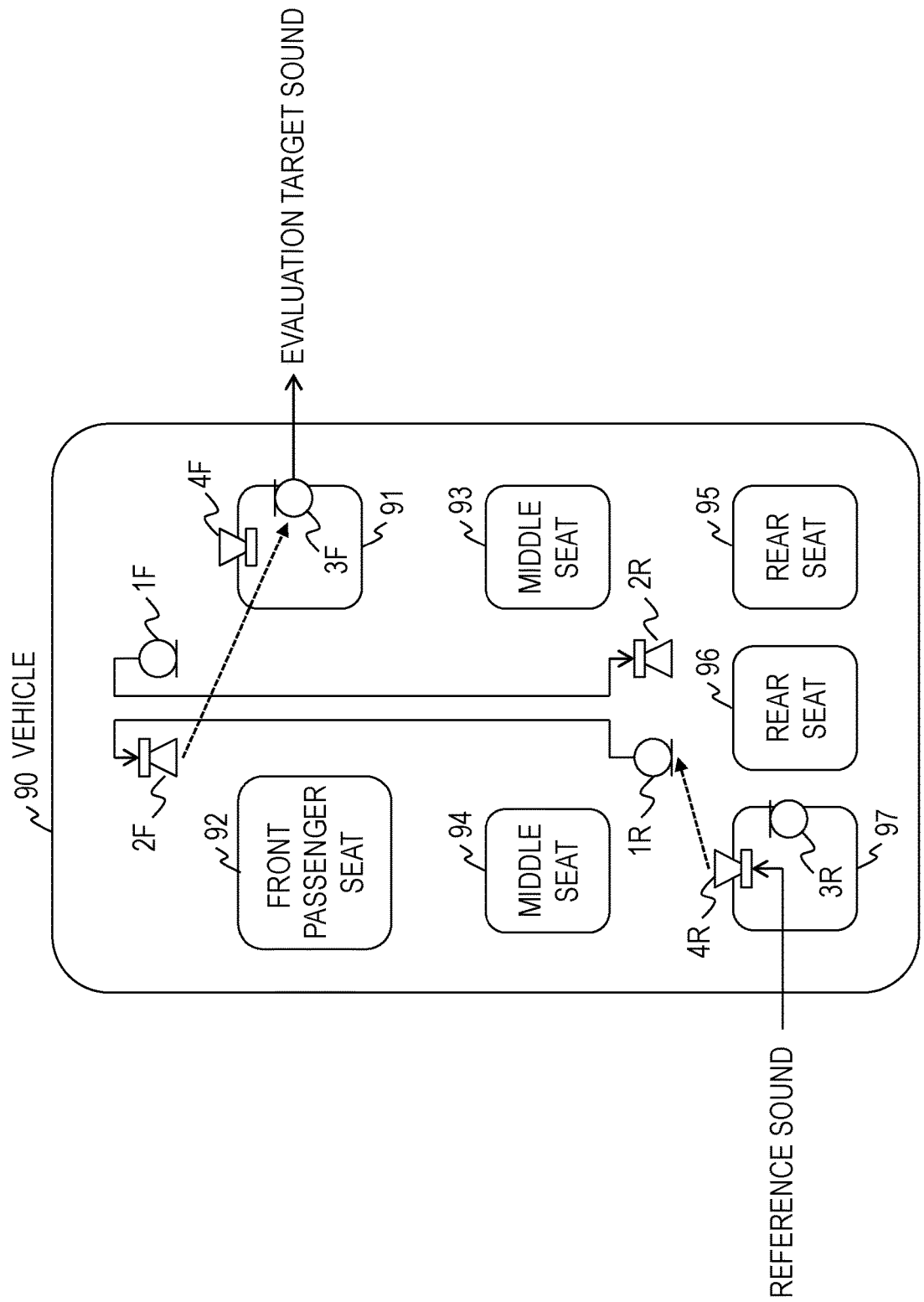
FIG. 9 is a diagram for explaining an example of an evaluation of acoustic quality of the ICC system.

In the case of evaluating acoustic quality of the ICC system using the acoustic quality evaluation system 10 illustrated in FIG. 2 or the acoustic quality evaluation system 20 illustrated in FIG. 9, it is necessary to make an evaluation for all combinations of seats inside the vehicle. However, because seats in the same row are expected to have similar acoustic conditions, an evaluation value acquired for a certain seat may also be used as the evaluation value of another seat in the same row. For example, in the case of assuming that an evaluation is made inside the vehicle 90 in which seats are arranged in three rows as illustrated by the example of FIG. 1, the evaluation value acquired between the driver's seat 91 and the rear seat 97 may also be used as the respective evaluation values between the driver's seat 91 and a rear seat 95, between the driver's seat 91 and a rear seat 96, between a front passenger seat 92 and the rear seat 95, between the front passenger seat 92 and the rear seat 96, and between the front passenger seat 92 and the rear seat 97. By this evaluation value reuse, number of combinations of seats to be evaluated in practice is reduced, and the costs required for the acoustic quality evaluation test can be reduced.

Figure 12:
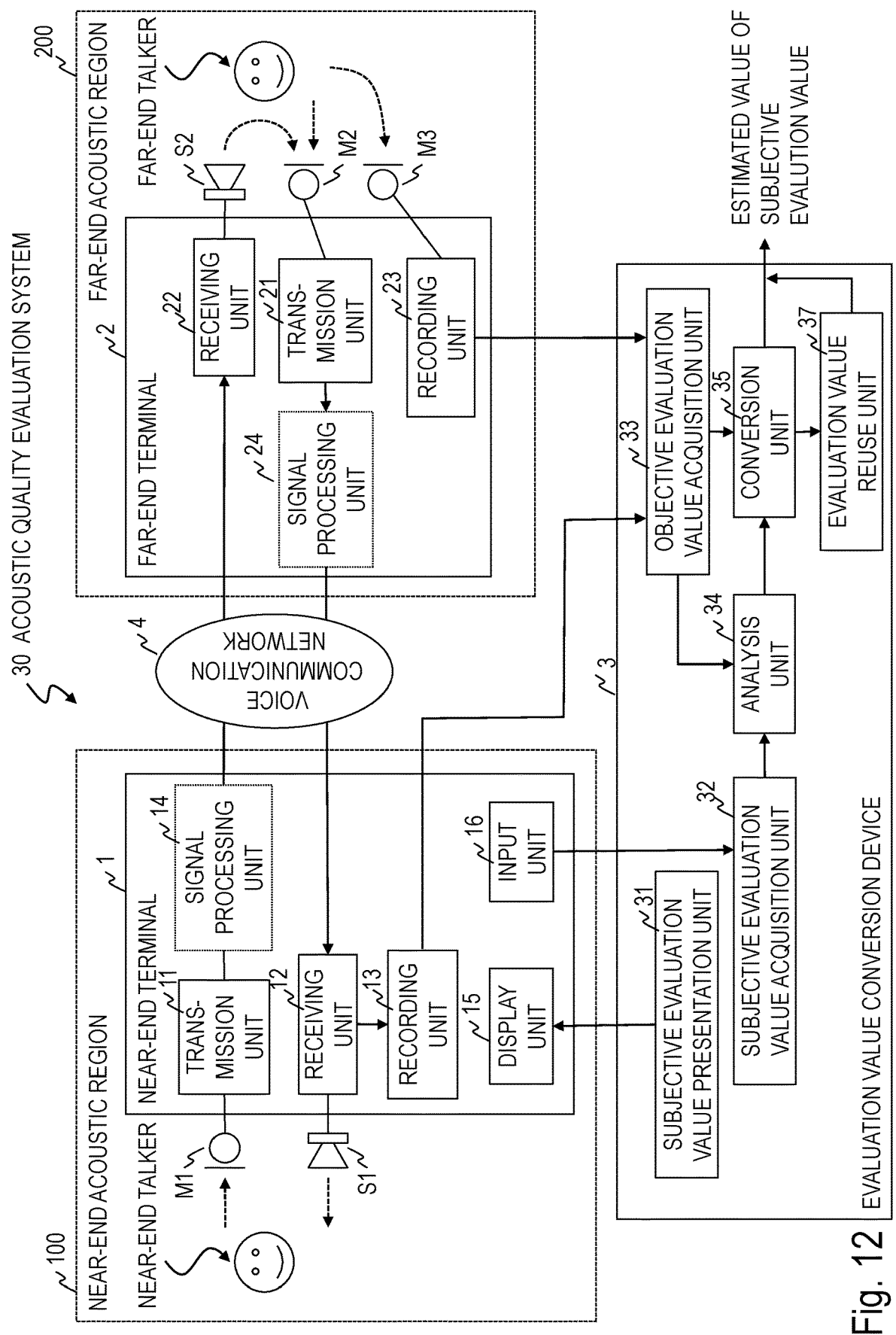
FIG. 12 is a diagram illustrating an example of a functional configuration of an acoustic quality evaluation system according to Modification 4.

As illustrated in FIG. 12, in an acoustic quality evaluation system 30 according to Modification 4, the evaluation value conversion device 3 is further provided with an evaluation value reuse unit 37 compared to the acoustic quality evaluation system 10 (FIG. 2) according to the embodiment. The configuration of Modification 4 is also applicable to Modification 3. In other words, in the acoustic quality evaluation system 20 according to Modification 3 illustrated in FIG. 11, the evaluation value conversion device 3 may be further provided with the evaluation value reuse unit 37 similarly to FIG. 12.

The evaluation value reuse unit 37 receives an estimated value of a subjective evaluation value acquired between a first seat and a second seat belonging to different acoustic regions from the conversion unit 35. At this time, it is assumed that an acoustic region is set for each row of seats inside the vehicle. For example, in the case of making an evaluation inside the vehicle 90 illustrated by the example of FIG. 1, acoustic regions are set such that the driver's seat 91 and the front passenger seat 92 belong to a first acoustic region, middle seats 93 and 94 belong to a second acoustic region, and the rear seats 95, 96, and 97 belong to a third acoustic region. The evaluation value reuse unit 37 acquires an estimated value of the subjective evaluation value as an evaluation value of communication between any seat belonging to the same acoustic region as the first seat and any seat belonging to the same acoustic region as the second seat (except between the first seat and the second seat where evaluation is made in practice). For example, if an estimated value of the subjective evaluation value between the driver's seat 91 and the rear seat 97 has already been acquired inside the vehicle 90 illustrated by the example of FIG. 1, the estimated value of the subjective evaluation value is acquired as the estimated value of the subjective evaluation value between the driver's seat 91 and either of the rear seats 95 or 96, or also between the front passenger seat 92 and any of the rear seats 95, 96, or 97.

In Modification 4, the combination of seats to actually acquire an evaluation value is preferably the seats that are farthest apart. For example, in the case of the vehicle 90 illustrated by the example of FIG. 1, it is beneficial to make an actual evaluation between the driver's seat 91 and the rear seat 97 or between the front passenger seat 92 and the rear seat 95. However, the configuration of Modification 4 is not limited to the case of making an actual evaluation for the combination of seats that are farthest apart (that is, the seats having the most unfavorable conditions), and is also effective in the case of making an actual evaluation between seats that are closer together (that is, seats having relatively favorable conditions).

Figure 13:
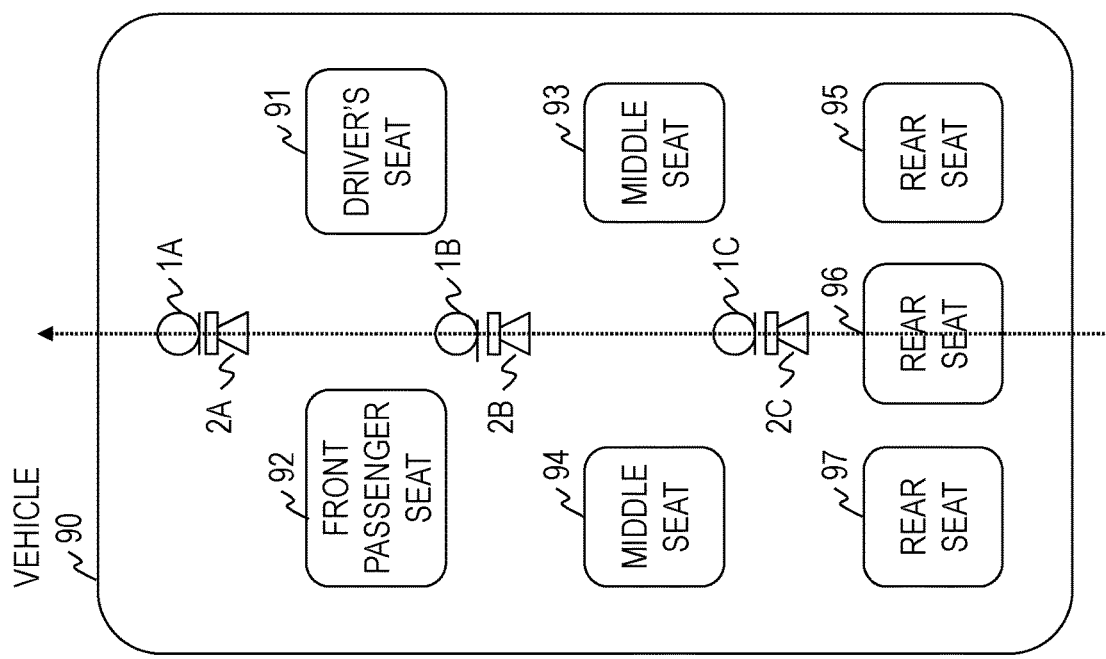
FIG. 13 is a diagram for explaining the arrangement of speakers and microphones according to Modification 4.
Figures 14A, 14B:
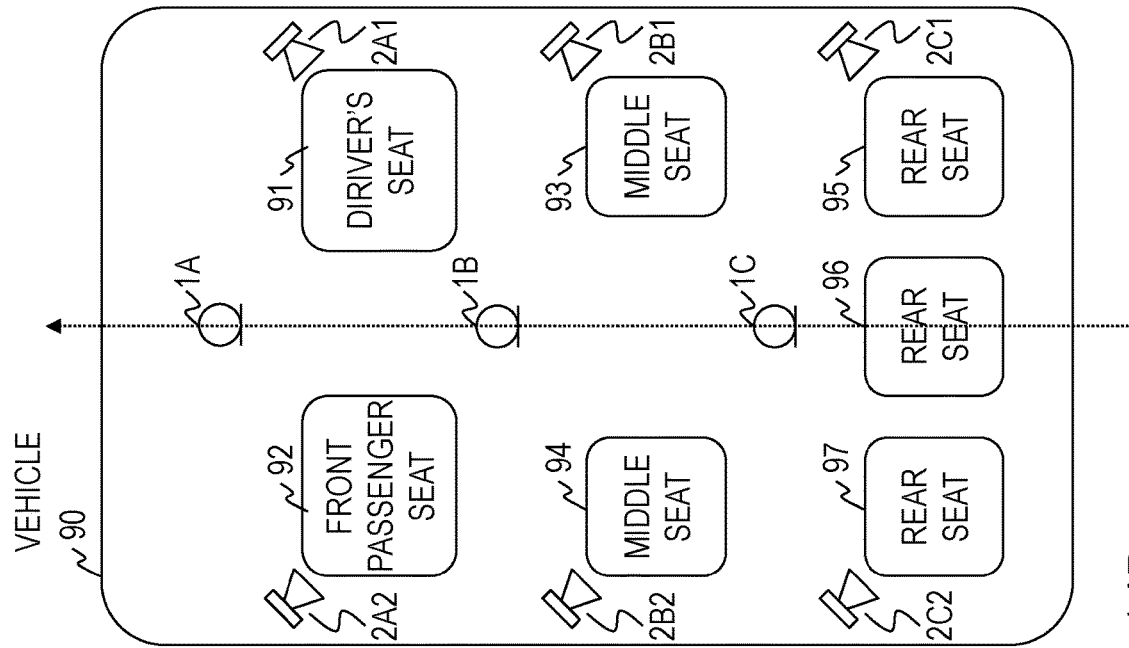
FIGS. 14A and 14B are diagrams for explaining the arrangement of speakers and microphones according to Modification 4.

The configuration of Modification 4 is particularly effective in the case where the speakers and microphones disposed inside the vehicle are arranged with left-right symmetry with respect to the forward direction of the vehicle as an axis. For example, as illustrated in FIG. 13, microphones 1A, 1B, 1C and speakers 2A, 2B, 2C may be disposed in the center of respective rows on the centerline of the forward direction of the vehicle 90. As another example, as illustrated in FIG. 14A, microphones 1A, 1B, and 1C may be disposed in the center of respective rows on the centerline of the forward direction of the vehicle 90, while a pair of speakers may be disposed on the left and right ends toward the back of each seat (for example, for the driver's seat 91, a speaker 2A1 is disposed behind and to the right and a speaker 2A2 is disposed behind and to the left). As another example, as illustrated in FIG. 14B, microphones 1A, 1B, and 1C may be disposed in the center of respective rows on the centerline of the forward direction of the vehicle 90, while a pair of speakers may be disposed on the left and right ends toward the front of each row (for example, for the first row, a speaker 2A1 is disposed in front by the window on the right side and a speaker 2A2 is disposed in front by the window on the left side). However, the configuration of Modification 4 is not limited to the case where speakers and microphones are arranged with left-right symmetry, and is also effective in cases where speakers and microphones are arranged without left-right symmetry.

<Modification 5>

A method of determining the appropriateness of an evaluation when double talk occurs as illustrated in Modification 3 will be described.

Among the acoustic pathways under the double talk with the assumption that the near-end talker is sitting in the driver's seat 91 and the far-end talker is sitting in the rear seat 97, attention will be paid to the acoustic pathways through which the acoustic signal emitted from the speaker 4R disposed by the rear seat 97 and picked up by the microphone 1R, subjected to signal processing such as echo cancellation and howling suppression as described above, and emitted from the speaker 2F (hereinafter, this signal is designated as "far-end talker signal") passes, and through which the acoustic signal emitted from the speaker 4F disposed by the driver's seat 91 and picked up by the microphone 1F, subjected to signal processing such as echo cancellation and howling suppression as described above, and emitted from the speaker 2R (hereinafter, this signal is designated as "near-end talker signal")passes. When double talk occurs, the far-end talker signal emitted from the speaker 2F is picked up by the microphone 1F for example, and an echo may occur in some cases. As described above, the precision of the echo cancellation performed at this time is also a target of evaluation by the acoustic quality evaluation system, but to make a more appropriate evaluation, it is also necessary to consider the sound pressure of the far-end talker signal emitted from the speaker 2F. For example, when considering that the acoustic signal emitted from the speaker 2F attenuates before arriving at the microphone 1F, the case where the far-end talker signal is emitted from the speaker 2F with a weak sound pressure will be given a higher evaluation. In other words, the evaluation value obtained when the sound pressure is inappropriate cannot be considered to be appropriate.

Accordingly, a sound pressure measurement unit and an appropriateness determination unit not illustrated may be added, the sound pressure may be measured by the sound pressure measurement unit, and only an evaluation value obtained in the case where the sound pressure emitted from the speaker 2F is a predetermined threshold value or higher may be determined to be an appropriate evaluation. A sound pressure control unit that controls the sound pressure to be the predetermined threshold value or higher in the case where the sound pressure is the predetermined threshold value or lower may also be provided. For the threshold, a value from 64 dB SPL to 70 dB SPL utilized for evaluating a teleconferencing device may be used, for example, or the threshold may be designed on the basis of the distance or the transmission characteristics of the speaker 2F, the microphone 1F, and the driver's seat 91 for each vehicle to be evaluated, for example.

Note that although an example in which the far-end talker signal acts as a source of echo is described, the present modification may also be used in the case where the near-end talker signal acts as a source of echo.

Furthermore, the appropriateness of the far-end talker signal itself may be determined. In other words, an objective evaluation may be performed between the acoustic signal emitted from the speaker 4R and picked up by the microphone 1R, and the acoustic signal before being emitted from the speaker 2F, and only the evaluations of acoustic quality of the ICC system when the talker signal evaluation results are equal to or greater than a predetermined value may be determined to be appropriate. Instead of an objective evaluation, an indicator value such as the squared error may simply be used.

Note that in the implementation of the present modification, voice signals emitted from the arranged people (speaker and evaluator) may be used instead of the acoustic signals emitted from the speakers 4R and 4F like in Modification 3. In this case, because a subjective evaluation value can be acquired, the conversion based on the subjective evaluation value and the objective evaluation value is obviously unnecessary.

According to the acoustic quality evaluation system according to the embodiment and modifications described above, it is sufficient to perform the minimum number of conversational tests enough to obtain a linear relationship for converting an objective evaluation value into a subjective evaluation value, making it possible to evaluate the quality of a loudspeaker hands-free communication system with fewer conversational tests. Furthermore, if the linear relationship is already known, the quality can be evaluated without performing a conversational test. Particularly, in a loudspeaker hands-free communication system with a variety of use conditions and communication channels such as ICC system, a huge number of test cases are expected, but the quality can be evaluated with a small number of conversational tests or without performing a conversational test, and consequently, a reduction in the costs required by quality evaluation can be anticipated.

The foregoing describes embodiments of the present invention, but the specific configuration is not limited to these embodiments, and appropriate design modifications or the like within a scope that does not depart from the gist of the present invention obviously, if any, are to be included in the present invention. The various processes described in the embodiments not only may be executed in a time series following the order described, but may also be executed in parallel or individually according to the processing performance of the device executing the process, or as needed.

[Program, Recording Medium]

In the case where the various processing functions in each device described in the above embodiment are achieved by a computer, the processing content of the functions to be included in each device is stated by a program. Additionally, by causing a computer to execute the program, the various processing functions in each device above are achieved on the computer.

The program stating the processing content can be recorded to a computer-readable recording medium. The computer-readable recording medium may be any type of medium such as a magnetic recording device, an optical disc, a magneto-optical recording medium, or semiconductor memory, for example.

Also, the program is distributed, for example, by selling, transferring, or lending a portable recording medium such as a DVD or CD-ROM on which the program is recorded, for example. Furthermore, the program may also be stored in a storage device of a server computer and distributed by transferring the program from the server computer to another computer over a network.

The computer that executes such a program first stores the program recorded on the portable recording medium or the program transferred from the server computer in its own storage device, for example. Additionally, when executing processes, the computer loads the program stored in its own storage device, and executes processes according to the loaded program. Also, as a different mode of executing the program, the computer may be configured to load the program directly from the portable recording medium and execute processes according to the program, and furthermore, the computer may be configured to execute processes according to the received program in succession every time the program is transferred to the computer from the server computer. Also, a configuration for executing the processes described above may also be achieved by what is called an application service provider (ASP) type service, in which processing functions are achieved by an execution instruction and a result acquisition only, without transferring the program from the server computer to the computer. Note that the program in this mode is assumed to include information that is used for processing by an electronic computer and conforms to the program (such as data that is not direct commands to the computer, but has properties that stipulate processing by the computer).

Also, in this mode, the device is configured by causing the predetermined program to be executed on the computer, but at least a portion of the processing content may also be achieved in hardware.

What is claimed is:

1. An evaluation method of evaluating a quality of communication between seats in a vehicle including at least three seats belonging to any of a plurality of acoustic regions, in which
   at least one speaker and at least one microphone are disposed for each acoustic region, and
   a voice signal picked up by a first microphone disposed in a first acoustic region is emitted from a second speaker disposed in a second acoustic region,
   the evaluation method comprising:
   acquiring, by a first evaluation value acquisition unit, a first evaluation value that is an evaluation value of communication between a first seat and a second seat by treating a voice signal obtained by combining a voice signal resulting from a first voice signal being emitted from a sound source in the first seat belonging to the first acoustic region, picked up by the first microphone, and emitted from the second speaker with a voice signal arriving at the second seat belonging to the second acoustic region as a result of the first voice signal being transmitted through a space inside the vehicle as a sound to be evaluated, and treating the first voice signal as a reference sound; and
   acquiring, by a second evaluation value acquisition unit, the first evaluation value as an evaluation value of communication between any seat belonging to the first acoustic region and any seat belonging to the second acoustic region, except between the first seat and the second seat.

2. The evaluation method according to claim 1, wherein the acoustic regions are set for each row of seats in the vehicle.

3. The evaluation method according to claim 2, wherein in the acoustic regions, either or both of the speakers and the microphones are arranged with left-right symmetry with respect to a forward direction of the vehicle.

4. An evaluation apparatus that evaluates a quality of communication between seats in a vehicle including at least three seats belonging to any of a plurality of acoustic regions, in which
   at least one speaker and at least one microphone are disposed for each acoustic region, and
   a voice signal picked up by a first microphone disposed in a first acoustic region is emitted from a second speaker disposed in a second acoustic region,
   the evaluation device comprising:
   a first evaluation value acquisition unit that acquires a first evaluation value that is an evaluation value of communication between a first seat and a second seat by treating a voice signal obtained by combining a voice signal resulting from a first voice signal being emitted from a sound source in the first seat belonging to the first acoustic region, picked up by the first microphone, and emitted from the second speaker with a voice signal arriving at the second seat belonging to the second acoustic region as a result of the first voice signal being transmitted through a space inside the vehicle as a sound to be evaluated, and treating the first voice signal as a reference sound; and
   a second evaluation value acquisition unit that acquires the first evaluation value as an evaluation value of communication between any seat belonging to the first acoustic region and any seat belonging to the second acoustic region, except between the first seat and the second seat.

5. A non-transitory computer-readable recording medium which stores a program causing a computer to function as an evaluation apparatus according to claim 4.

* * * * *